(12) United States Patent
Dougherty et al.

(10) Patent No.: US 6,211,822 B1
(45) Date of Patent: Apr. 3, 2001

(54) SPACEBORNE GLOBAL POSITIONING SYSTEM FOR SPACECRAFT

(75) Inventors: Lamar F. Dougherty, Fairfax, VA (US); Frederick A. Niles, Laurel; Miriam D. Wennersten, Havre DeGrace, both of MD (US)

(73) Assignee: The United States of America as represented by the Administrator of the National Aeronautics and Space Adminstrations, Washington, DC (US)

( * ) Notice: Subject to any disclaimer, the term of this patent is extended or adjusted under 35 U.S.C. 154(b) by 0 days.

(21) Appl. No.: 09/348,876

(22) Filed: Jul. 7, 1999

Related U.S. Application Data
(60) Provisional application No. 60/092,491, filed on Jul. 8, 1998.

(51) Int. Cl.[7] .................................................. H04B 7/185
(52) U.S. Cl. ............................... 342/357.12; 342/357.06; 342/357.15
(58) Field of Search ......................... 342/357.06, 357.05, 342/357.12, 357.15, 357.1; 701/213

(56) References Cited

U.S. PATENT DOCUMENTS

| | | | |
|---|---|---|---|
| 5,144,318 | * | 9/1992 | Kishi ................................... 342/357 |
| 5,187,805 | * | 2/1993 | Bertiger et al. ..................... 455/12.1 |
| 5,402,347 | * | 3/1995 | McBurney et al. .................. 364/443 |
| 5,471,220 | * | 11/1995 | Hammers et al. ................... 342/372 |
| 5,629,708 | * | 5/1997 | Rodal et al. ......................... 342/357 |
| 5,635,940 | * | 6/1997 | Hickman et al. .................... 342/389 |
| 5,751,245 | * | 5/1998 | Janky et al. ......................... 342/357 |
| 5,764,189 | * | 6/1998 | Lohninger ..................... 343/700 MS |
| 5,790,175 | * | 8/1998 | Sklar et al. .............................. 348/8 |

* cited by examiner

*Primary Examiner*—Thomas H. Tarcza
*Assistant Examiner*—Dao L. Phan
(74) *Attorney, Agent, or Firm*—Michael J. Gonet; Keith L. Dixon

(57) ABSTRACT

The spaceborne Global Positioning System receiver provides navigational solutions and is designed for use in low Earth orbit. The spaceborne GPS receiver can determine the orbital position of a spacecraft using any of the satellites within the GPS constellation. It is a multiple processor system incorporating redundancy by using a microcontroller to handle the closure of tracking loops for acquired GPS satellites, while a separate microprocessor computes the spacecraft navigational solution and handles other tasks within the receiver. The spaceborne GPS receiver can use either microcontroller or the microprocessor to close the satellite tracking loops. The use of microcontroller provides better tracking performance of acquired GPS satellites. The spaceborne GPS receiver utilizes up to seven separate GPS boards, with each board including its own set of correlators, down-converters and front-end components. The spaceborne GPS receiver also includes telemetry and time-marking circuitry. The spaceborne GPS receiver communicates with other spacecraft systems through a variety of interfaces and can be software-configured to support several different mission profiles.

27 Claims, 17 Drawing Sheets

$\Theta_1 < \Theta_2$
$\Theta_1$ is the smallest angle between the APV and a GPS satellite
$\Theta_2$ is the second smallest angle between the APV and a GPS satellite Θ₁ is the smallest angle between the APV and a GPS satellite
Θ₂ is the first most orthogonal vector to the GPS satellite vector represented by Θ₁
Θ₃ is the second most orthogonal vector to the GPS satellite vector represented by Θ₁

SPACEBORNE GLOBAL POSITIONING SYSTEM FOR SPACECRAFT

CROSS-REFERENCES TO RELATED APPLICATIONS

This application claims priority from co-pending U.S. Provisional Patent Application Ser. No. 60/092,491 filed on Jul. 8, 1998, which is incorporated herein by reference for all it discloses.

ORIGIN OF INVENTION

The invention described herein was made by employees of the United States Government, and may be manufactured and used by or for the Government for governmental purposes without the payment of any royalties thereon or therefor.

TECHNICAL FIELD

This invention is directed to a computer-controlled navigation system for spacecraft. The invention provides navigational solutions for a low Earth orbit spacecraft that is positioned in any orientation, including non-nadir orientations.

BACKGROUND

Spacecraft require equipment that calculates the orbital position, velocity, time, and attitude. Traditionally, ground-based tracking systems are used to determine the spacecraft's position. The advent of the NAVSTAR satellite system, otherwise known as the Global Positioning System ("GPS"), increased the desirability of using onboard processing systems for spacecraft position determination.

The GPS satellite system is a collection of satellites that can be used for missile, satellite, aircraft, and terrestrial navigation. Each GPS satellite broadcasts its own ephemeris and time, thereby allowing a GPS receiver to determine its position. Typically, a GPS receiver calculates its position from the simultaneous observation of any four GPS satellites in order to calculate its position. A civil grade GPS receiver can accurately determine its position within 20 meters, determine its velocity within 0.6 meters/second, and the current time with a 10-nanosecond accuracy. Usually, twenty-four valid GPS satellites are in the GPS almanac at any given time.

A GPS receiver is typically an autonomous instrument that transforms signals from GPS satellites into point solutions for spacecraft. Current GPS receivers have a radio frequency section for receiving and converting signals received from a spacecraft's antennas. The digitized signals are then forwarded to one or more correlators, controlled by the receiver's own processor. The correlators look for matches between the incoming signal and the C/A code for different satellites. When a satellite lock occurs, or the incoming signal matches an internally generated pseudo random noise (PRN) code, the receiver's processor is notified. The processor contains executable code to generate a pseudo-range or a line-of-sight distance to the satellite. The processor will also contain the executable code of an orbit propagator. The pseudo-range is an input to the navigation solution that calculates point solutions for tracking the orbit of the spacecraft.

Previous spaceborne GPS receivers have been limited in that they must operate in a near nadir orientation. In previous designs, in order for a GPS receiver to determine its position, it must acquire the signals of at least three GPS satellites. Previous spaceborne GPS receivers assume that they are positioned in nadir orientation, and make certain assumptions as to particular GPS satellite availability. It is these assumptions that precipitate an increase in GPS satellite search and acquisition time, as the particular GPS satellite that a receiver is attempting to acquire may be outside the antenna envelope and/or blocked by the spacecraft. If a GPS receiver of previous design acquires one GPS satellite, it still needs to acquire two more satellites for a solution.

For example, if the antenna of a current GPS receiver is pointing parallel to the horizon, then additional problems are made clearer. Algorithms in current GPS receivers assume a nadir orientation, and thus the satellites available for acquisition are quite different than if the antenna is pointing nadir. The GPS receiver attempts to acquire GPS satellites that will not be in the location predicted by the receiver's algorithms or receivable by the antennas.

To acquire a GPS satellite, three dimensions of search space must be examined: GPS satellite number, code phase, and carrier frequency. Unless all three values match the incoming signal, no correlation will occur.

Referring to FIG. 1, there are 1023 shifts in the GPS C/A code phase. One GPS C/A code phase represents 300 meters or one second of error. A significant portion of the correlation time must be spent on the correct code shift phase in order to have a successful correlation. A factor of four is an accepted value to shift through the code phase. Thus, the correlator must "check" approximately four thousand different code shifts.

An additional problem faced by spaceborne GPS receivers is the increased range of Doppler shift that occurs in a spacecraft. To obtain satisfactory signal correlation, the GPS receiver must correlate the incoming GPS signal to within approximately 500 hertz before a traditional phase-lock loop or frequency-lock loop can lock onto the GPS signal. A GPS receiver on the ground encounters a Doppler shift on the order of ±5 kilohertz, which is easily handled. The GPS receiver will only have to examine approximately twenty frequency rows (i.e., frequency bands of 500 hertz that cover a total frequency range of 10 kilohertz) in order to acquire the desired GPS signal. One 500-hertz frequency row represents a 100-meter/second velocity error along the line-of-sight between a GPS receiver and a GPS satellite. However, in a low circular Earth orbit, the Doppler shift encountered is on the order of ±45 kilohertz. Referring to FIG. 1, two hundred frequency rows (i.e., frequency bands of 500 hertz that cover a total frequency range of 100 kilohertz) are required to acquire an incoming GPS signal.

Additionally, since each "dimension" of search space is independent of the other dimension, the number of bins to check for a low Earth orbit GPS receiver is approximately twenty million (25 satellites * 4000 code shifts * 200 frequency rows). A bin is a frequency row that is searched for a particular code shift. Correlation time also has a minimum value of approximately one millisecond to see any statistically meaningful value emerge. Thus, to search the full space with a single correlator channel, it would require over five and one-half hours. However, since the period of a low Earth orbit is approximately ninety minutes, this presents a significant problem.

In addition, due to spacecraft motion, GPS satellites are in view for much shorter time periods than when viewed from a ground reference. The appearance and disappearance of GPS satellites from view causes their output signals to slew through the entire range of the 45-kilohertz Doppler shift. As described above, when a GPS signal is acquired, the aggregate correlation time must exceed one millisecond in order to achieve a statistically meaningful value. Current GPS receivers are unable to accommodate such large Doppler shifts in their processing and their processing capacity prevents rapid shifting between acquired satellites.

SUMMARY OF INVENTION

The present invention has been made in view of the above circumstances and has as an object to overcome the above problems and limitations of the prior art, and has a further object to provide an apparatus for providing navigational solutions for spacecraft in low Earth orbits in nadir or non-nadir orientations.

Additional object and advantages of the present invention will be set forth in part in the description that follows and in part will be obvious from the description, or may be learned by practice of the invention. The objects and advantages of the invention may be realized and attained by means of the instrumentalities and combinations particularly pointed out in the appended claims.

Accordingly, it is a general object of the present invention to provide a GPS receiver, including a spaceborne GPS receiver, capable of overcoming the above and other problems associated with the prior art.

It is a further object of the invention to provide a multiple processor spaceborne GPS receiver that provides enhanced tracking performance of acquired GPS satellites.

It is yet a further object of the invention to provide multiple channels to locate any GPS satellite within view of the spaceborne GPS receiver.

It is still a further object of the invention to provide a spaceborne GPS receiver that can provide a navigational solution for a spacecraft oriented in a non-nadir position.

The above and other objects of the present invention are accomplished by providing a spaceborne apparatus for receiving global positioning signals, wherein the spaceborne apparatus includes a GPS board for receiving global positioning system satellite signals, a processor for controlling the GPS board, and a motherboard to facilitate connections between the processor and the GPS board.

The above and other objects of the present invention are further accomplished by a spaceborne apparatus including a processor for computing a navigational solution.

The above objects are further achieved by a spaceborne apparatus including an interface bus for transmission and reception of commands and data for further analysis by the processor, and a motherboard to facilitate connections between the processor, the interface bus and the GPS board.

According to the present invention, the motherboard includes current monitoring circuitry, latch-up protection circuitry, a power supply, and an electromagnetic interference filter.

In further accordance with the above objects, the present invention provides a GPS board including a radio-frequency front-end receiver for receiving input from an antenna, a correlator for correlating output from the radio-frequency front-end receiver, and a microcontroller for controlling the correlator.

In further accordance with the above objects, the present invention provides a GPS board including a plurality of radio-frequency front-end receiver receiving input from a plurality of antennas, a plurality of correlators for correlating output from the plurality of radio-frequency front-end receivers, and a microcontroller for controlling the plurality of correlators.

The above objects are further achieved by providing a plurality of GPS boards, wherein each GPS board is controlled by the processor.

In further accordance with the above objects, the present invention provides a monitoring circuit for output of housekeeping data from the GPS receiver.

In further accordance with the above objects, the present invention provides an interface state machine for the control of interrupts and a shared memory that is accessible by both the microcontroller and microprocessor.

According to the present invention, the closing of the tracking loops for acquired GPS satellites can be performed by the microcontroller on the GPS board or the microprocessor on the processor board.

BRIEF DESCRIPTION OF DRAWINGS

The accompanying drawings, which are incorporated in and constitute a part of this specification illustrate embodiments of the invention and, together with the description, serve to explain the objects, advantages and principles of the invention. In the drawings.

DETAILED DESCRIPTION OF THE INVENTION

A detailed description of preferred embodiments of a spaceborne GPS receiver for a spacecraft with a nadir or non-nadir orientation embodying the present invention will now be given referring to the accompanying drawings. The present invention allows for processing redundancy necessary for spaceborne equipment and is modular, thereby allowing multiple GPS signal processing boards to be controlled by a general-purpose processor.

Figure 1:
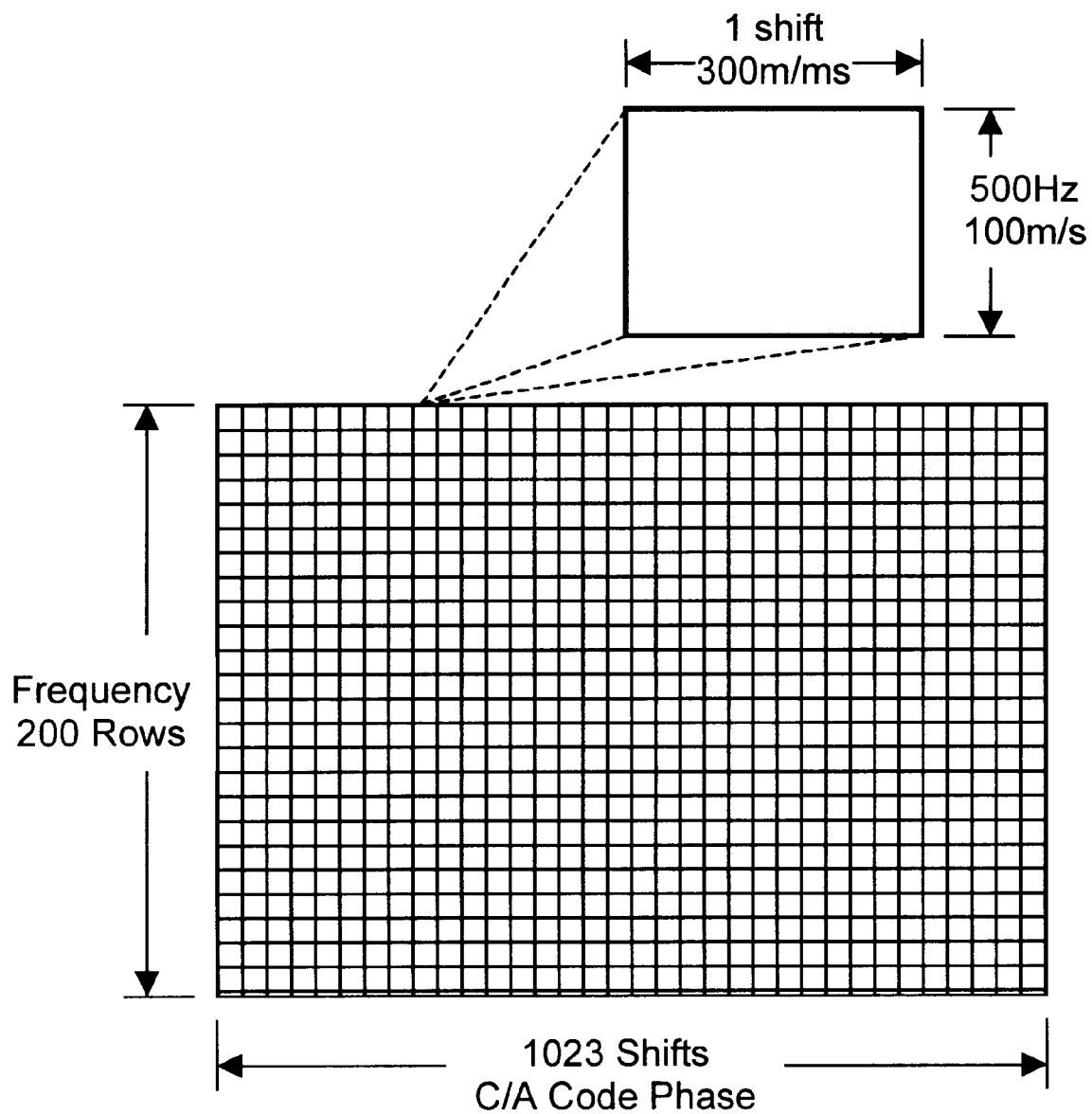
FIG. 1 illustrates the frequency rows and code phase shifts to be searched by a GPS receiver.
Figure 2:
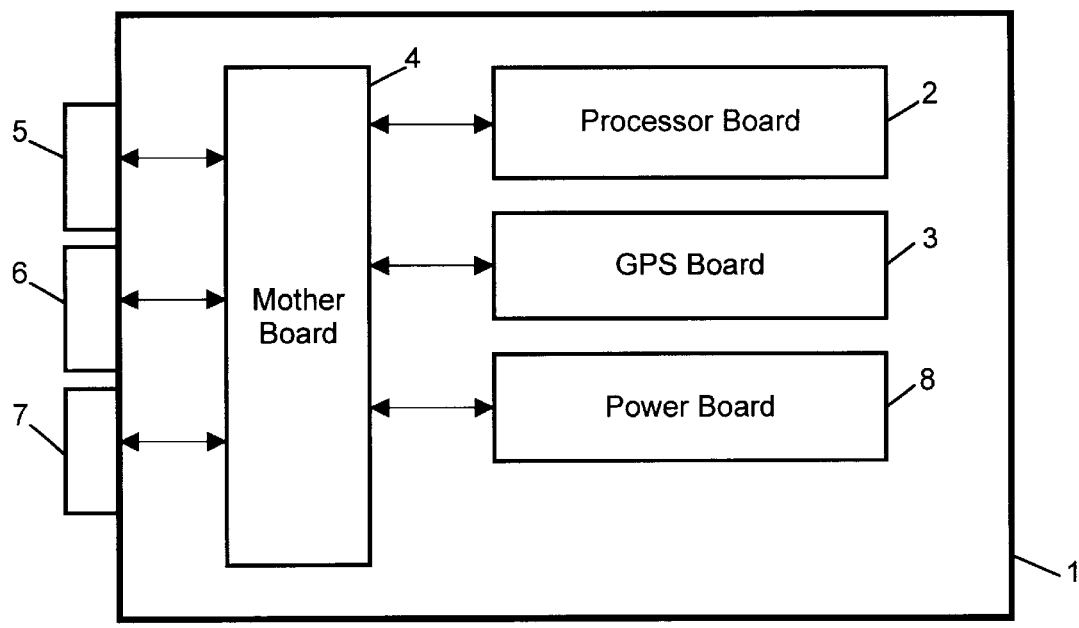
FIG. 2 illustrates the preferred embodiment of the spaceborne GPS receiver, according to the present invention.

Referring to FIG. 2, the preferred embodiment of a GPS receiver according the present invention is illustrated. The spaceborne GPS receiver 1 is self-contained, requiring only connections to a power bus and the communication busses within a spacecraft. The power connector 5, the signal connector 6 and the antenna connector 7 are shown as standalone connectors in FIG. 2, but are not limited to single connection points. The spaceborne GPS receiver 1 includes a processor board 2, a GPS board 3, a power board 8 and a motherboard 4. The spaceborne GPS receiver 1 is a multiple processor apparatus, with a microprocessor 34 located on the processor board 2 for computing the navigational solutions and a microcontroller 65 located on the GPS board 3 for implementing the satellite tracking algorithms. The spaceborne GPS receiver 1 includes up to seven GPS boards, each with its own microcontroller.

Figure 3:
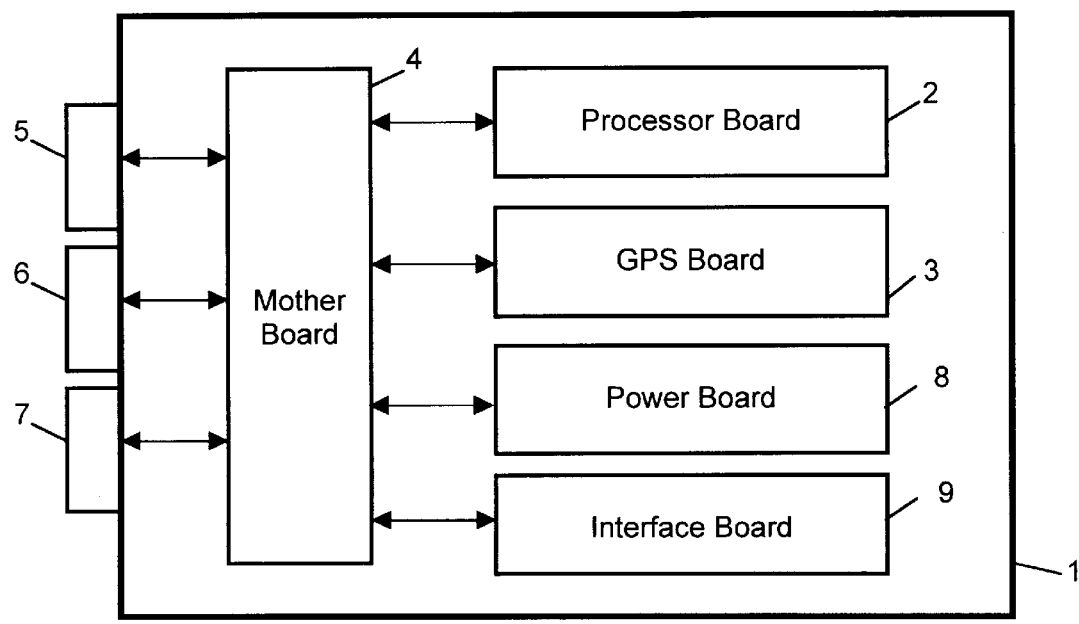
FIG. 3 illustrates a second embodiment of the spaceborne GPS receiver, according to the present invention.

Referring to FIG. 3, a second embodiment of the spaceborne GPS receiver 1 includes a processor board 2, a GPS board 3, a motherboard 4, a power board 8 and an interface board 9. The interface board 9 is for command, control, or data transmission functions, and is a commercially available component. Bus standards, such as MIL-STD-1553A, MIL-STD-1553B or ARINC-429 may be used, and spaceborne GPS receiver 1 can be configured as either a remote terminal or a bus master.

In the preferred embodiment, all the data processing and control of the spaceborne GPS receiver 1 is accomplished by the processor board 2. The processor board 2 executes various tasks, such as computing navigational solutions, updating of the GPS satellite constellation almanac, or servicing the GPS board 3.

Figure 4:
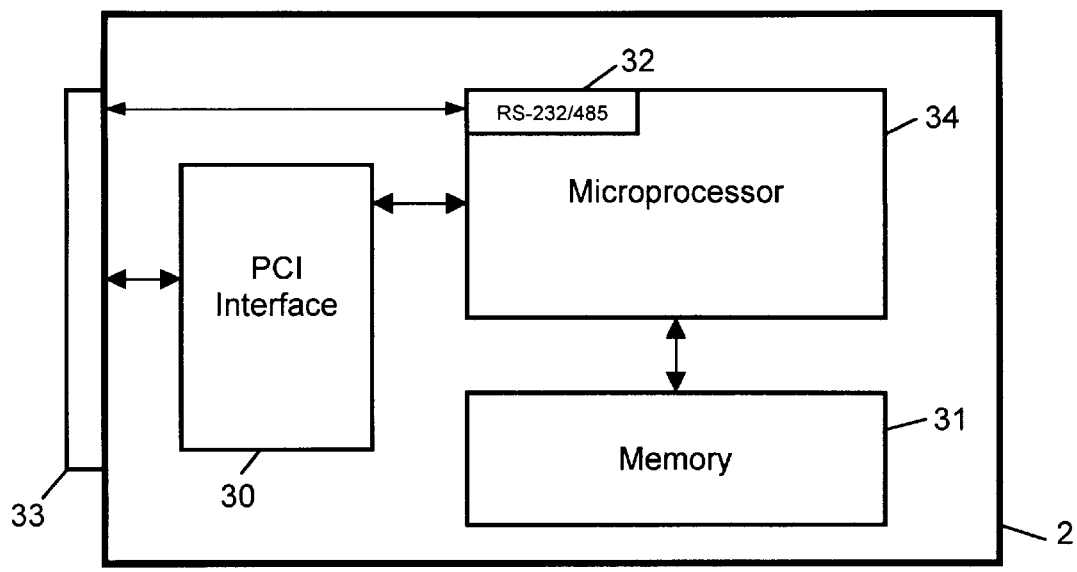
FIG. 4 illustrates a block diagram of the processor board as used in the spaceborne GPS receiver of FIGS. 2 and 3.

Referring to FIG. 4, a preferred embodiment of the processor board 2, including a microprocessor 34, a memory 31, a RS-232/485 interface 32, a PCI interface 30, and a compact PCI ("CPCI") connector 33, is illustrated. For clarity's sake, other components, such as glue logic, discrete input/output, specialized processor support circuits, and wiring are not shown, as they are known in the art. Preferably, the microprocessor 34 used for navigational solutions is a radiation-tolerant RISC-based processor. The microprocessor 34 used for the processor board 2 is not limited to RISC-based microprocessors, as x86-based and other microprocessors are suitable for use in the spaceborne GPS receiver 1 as well.

The preferred embodiment of the processor board 2 supports the use of multiple configurations for microprocessor memory 31. The memory 31 includes selectable combinations of dynamic random access memory ("DRAM"), programmable read-only memory ("PROM"), flash programmable read-only memory ("FLASH") and static random access memory ("SRAM"). Preferably, the memory 31 is mounted on a daughterboard that is connected to the processor board 2, and therefore allows removal for replacement or upgrading. The memory 31 may be mounted on the processor board 2 as well.

The DRAM portion of the memory 31 is used for software integration while the spaceborne GPS receiver 1 is on the ground, as DRAM memory is not suitable for use in space-based applications. Loading the software image under test into the FLASH portion of the memory 31 is time-consuming and FLASH memory chips have limited life cycles. Thus, for integration speed, the DRAM portion of the memory 31 is used. Use of the DRAM portion of the memory 31 also allows a configured software build to be maintained in the FLASH portion of the memory 31 on the processor board 2 while integration of newer builds progresses.

The FLASH portion of memory 31 stores the software image that is executed by the microprocessor 34. At startup, the microprocessor 34 reads the boot image stored in the PROM portion of the memory 31. One of the tasks, stored in the PROM portion of the memory 31, executed by the microprocessor 34 is to transfer the software image stored in the FLASH portion of the memory 31 to the SRAM portion of the memory 31. After completing the image transfer, the microprocessor 34 will then execute the software image from the SRAM portion of the memory 31. The SRAM portion of the memory 31 may also be used as a scratch pad memory by the microprocessor 34. Besides storage of the software image, the FLASH portion of the memory 31 is also used for periodic storage of the spacecraft ephemeris and the GPS satellite constellation almanac.

Referring to FIG. 4, in the preferred embodiment, the RS-232/485 interface 32 is used for several purposes. For example, the RS-232/485 interface 32 can be used to access the microprocessor 34 directly for software debugging or other console-type functions. Commands and data from other spacecraft instrumentation can be sent to the processor board 2 via the RS-232/485 interface 32. In addition, the RS-232/485 interface 32 can be used to load a new software image into the FLASH portion or the DRAM portion of the memory 31, either while the spaceborne GPS receiver 1 is on the ground or while in orbit. As stated above, the new software image would only be loaded into the DRAM portion of the memory 31 if the spaceborne GPS receiver 1 were on the ground. The RS-232/485 interface 32 can be used for command and control of the spaceborne GPS receiver 1 as well. The uses outlined here are not limiting and a skilled artisan will surely expand upon the aforementioned uses for these interfaces to suit particular requirements.

In the preferred embodiment, the connector 33 on the processor board 2 conforms to the CPCI interface standard. All power and data connections between the processor board 2 and the other elements of the spaceborne GPS receiver 1 pass through the connector 33. Communications to the PCI backplane of the motherboard 4 must first pass through a PCI interface 30, which provides the proper signaling and handshaking required for transmitting and receiving data over a PCI bus. The processor board 2 of the preferred embodiment is manufactured according to the industry-standard 3U-form factor, which dictates board dimensions of 100 mm by (typically) 160 mm. The use of the PCI bus standard is preferred for all embodiments, as the bus standard provides greater bandwidth for data exchange rates and modularity. Other bus standards can be used for various embodiments of the present invention.

In the preferred embodiment, the spaceborne GPS receiver 1 is contained in an enclosure that is suited to the rigors of space flight, and can survive temperature extremes common to space flight. For example, acceleration forces up to fifteen times the force of gravity in each axis are common, due to liftoff, rocket motor separation, or other activities occurring while achieving or maintaining orbit. In addition, the enclosure incorporates shielding around each GPS board 3 in order to minimize cross-talk and to inhibit coupling between the GPS board 3 and the processor board 2, and to withstand the electromagnetic disturbances of outer space without any performance degradation.

Figure 5:
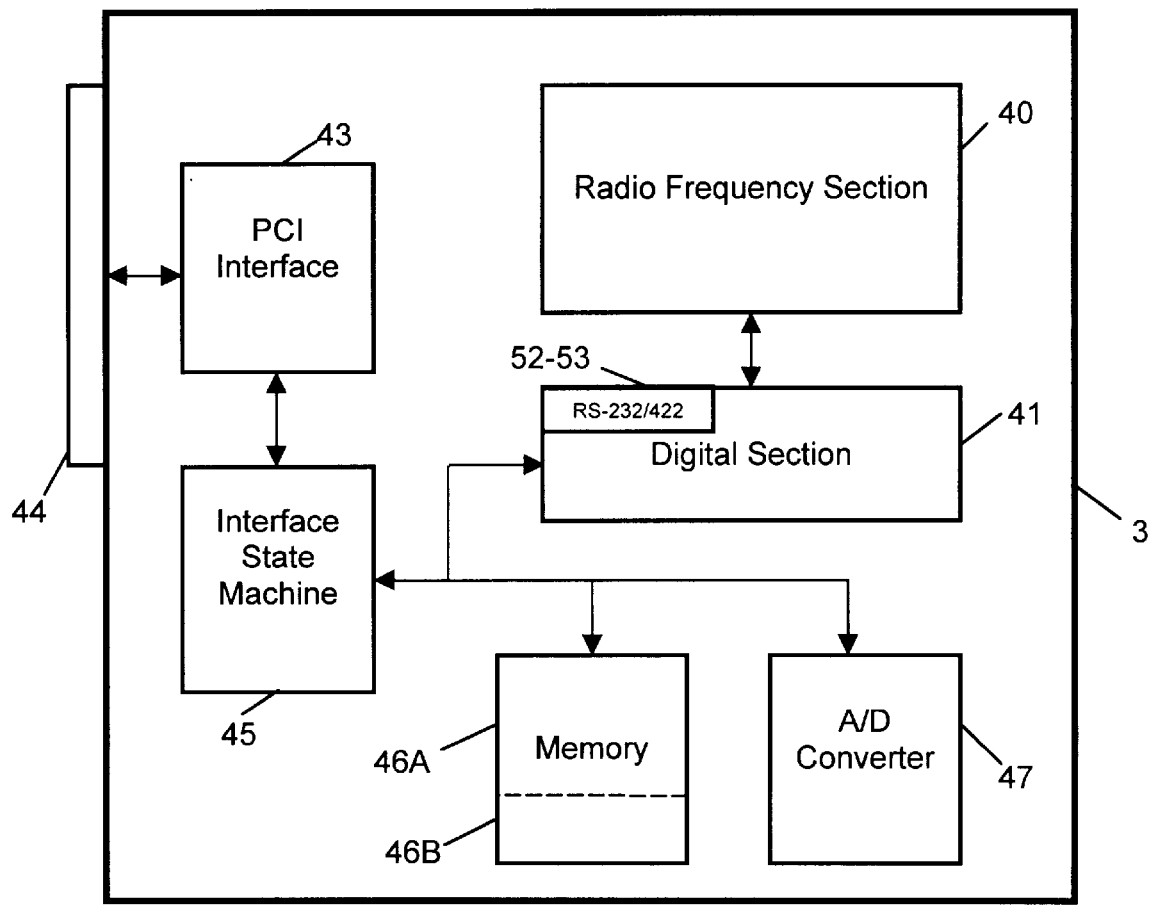
FIG. 5 illustrates a block diagram of the GPS board as used in the spaceborne GPS receiver of FIGS. 2 and 3.

Referring to FIG. 5, the preferred embodiment of the GPS board 3 is illustrated in more detail. The preferred embodiment includes a digital section 41 and a radio frequency section 40, along with a PCI interface 43 and a CPCI connector 44. The GPS board 3 further includes an interface state machine 45, a memory 46A,46B and an analog-to-digital converter 47.

Additional elements such as wiring and individual connectors are not shown for clarity's sake as they are known in the art. As described above, multiple GPS boards can be connected to the motherboard 4.

In the preferred embodiment, the interface state machine 45 routes correlator interrupts to either the microprocessor 34 or the microcontroller 65. The interface state machine 45 also translates requests from the PCI interface 43 and the microprocessor 34 for the appropriate destination, i.e., correlators, shared memory or analog-to-digital converter. The interface state machine 45 handles the address decoding, timing constraints and handshaking between the PCI interface 43 and the interface state machine 45.

The software command state machine interprets an HDLC-like software protocol to ensure the integrity of data transmitted over the communications links. The software command state machine is code that the microprocessor 34 uses to interprets a commands used for the transmission of telemetry data. Each command sent to the spaceborne GPS receiver 1 may result in telemetry data being sent back. Each command will also incorporate a frequency response code that will indicate to the software command state machine the periodic rate that the telemetry data will be output.

The software command state machine has a hardware pulse line to a host computer. When a command request for accurate time information is received, the correlators 50,51 will toggle this hardware line at the moment of measurement. This pulse is described further below regarding the time-marking function.

The memory 46A,46B is composed of two memory sections. One memory section 46A is used by microcontroller 65 as its main memory. The second memory section 46B is shared memory that is used by both the microprocessor 34 and the microcontroller 65.

The shared portion 46B of the memory 46 facilitates communications between the microprocessor 34 and the microcontroller 65. The microprocessor 34 will place information in a particular mapped memory location that will instruct the microcontroller 65 to start searching for a specified GPS satellite, using a specific channel, frequency and search pattern. The microcontroller 65 will go looking for a correlation using those specified parameters until another setup command is input by the microprocessor 34.

In the preferred embodiment, when the correlators 50,51 have locked onto a satellite, the data message is decoded by the microcontroller 65, along with certain tracking information, and inserted into the shared portion 46B of the memory 46. The microprocessor 34 will retrieve this information at a periodic rate, and use it to update the satellite navigation, attitude determination and satellite selection information.

Figure 6:
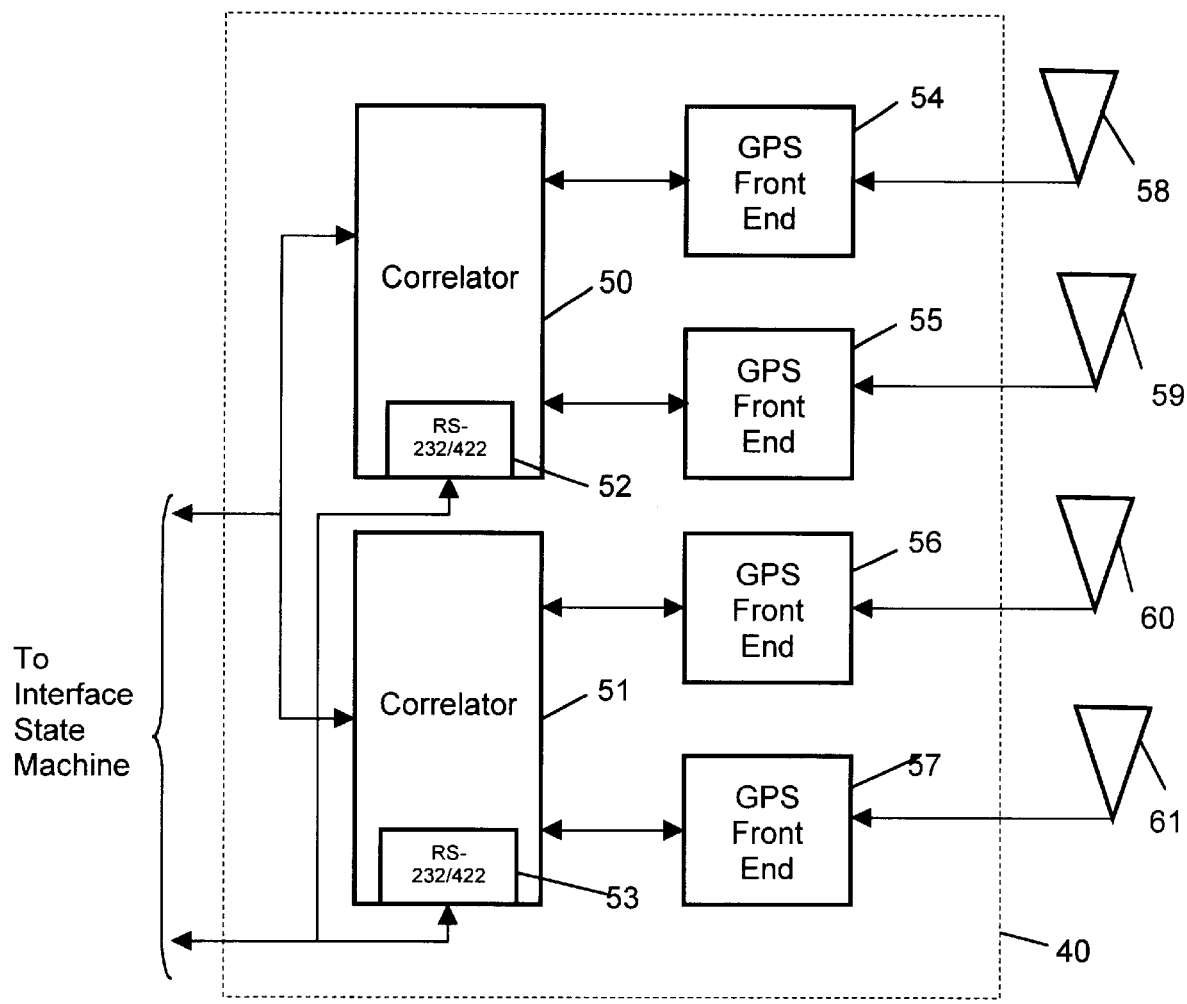
FIG. 6 illustrates a block diagram of the radio frequency section of the GPS board of FIG. 5, including the external antenna connections.

Referring to FIG. 6, the radio-frequency section 40 further includes two correlators 50–51 and four GPS front ends 54–57. Each of the front ends 54–57 is connected to one of antennas 58–61. Preferably, GEC Plessey GP2010 front-end components are utilized, as are industry standard GPS antennas, each with a low noise amplifier embedded in the antenna itself. A lesser number of antennas and corresponding GPS front-ends can also be used.

As shown in FIG. 6, each correlator is connected to two front ends. In the preferred embodiment, the correlators are GEC Plessey GP2021s, each embodying two UARTs for data reception and transmission over a RS-232/422 serial bus 52–53. Each correlator supports twelve separate channels. The mapping of channels to front ends is user defined, and re-mapping can occur as desired.

The GPS front-ends 54–57 are down-converters for the GPS signals that are received by the antennas 58–61. In the preferred embodiment, GEC Plessey down-converters are utilized. The GPS front-ends 54–57 down-convert the received GPS signals from 1575.42 megahertz to 4.309 megahertz. The down-converted GPS signal is passed to an analog to digital (A/D) converter to digitize the received signal for use by the correlators 50,51.

The entire GPS spectrum is passed through the GPS front-ends 54–57 and into the correlators 50,51. The correlators 50,51 mix generated pseudo random noise codes with the received signal frequencies in order to acquire a particular GPS signal. The digitized data form is used by the microprocessor 34 or the microcontroller 65 to close the code phase and carrier tracking loops.

The GPS board 3 also incorporates a time-marking function. The correlators 50,51 can include this function, or it may be a separate circuit. The time-marking function is used by other equipment within the spacecraft. When a computed time and velocity are reported to the spacecraft, the time at which those values were valid is also reported. Whenever the computed time and position data is reported, however, time is lost due when transferring the data. The correlators 50,51 will output a one-millisecond timing pulse to be used as an accurate timing reference. This time-mark signal is output through a discrete output pin, with a corresponding message being sent out over the RS-232/422 serial buses 52,53. The time-mark can also be correlated with the Universal Time Co-Ordinated system.

Figure 7:
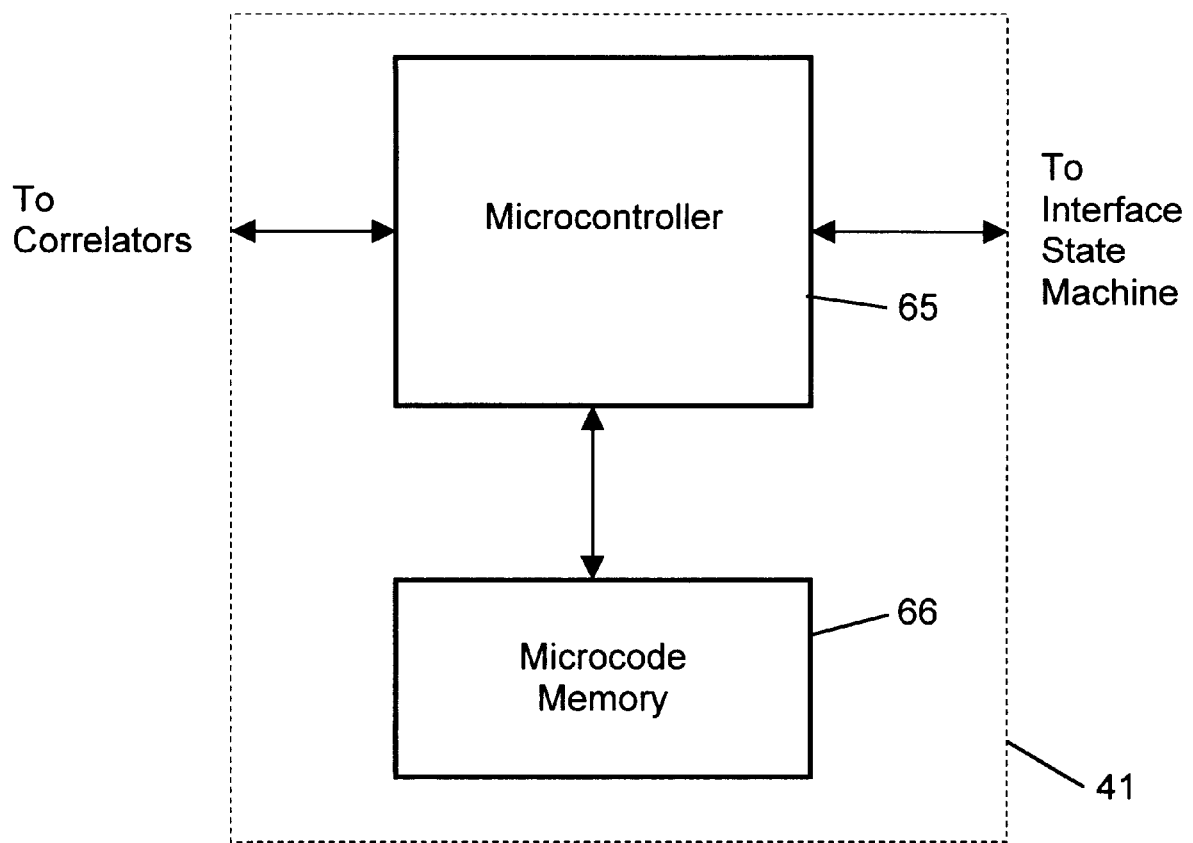
FIG. 7 illustrates a block diagram of the digital section of the GPS board of FIG. 5.

Referring to FIG. 7, the digital section 41 further includes a microcontroller 65 and a memory 66. Preferably, the microcontroller 65 is a commercially available chip, and is radiation-tolerant. The memory 66 embodies the microcode necessary for the microcontroller 65 to control the correlators 50,51 according to commands issued by the processor board 2. Other elements, such as wiring and any required glue logic, are not illustrated as these are known elements in the art and therefore a detailed explanation thereof is omitted from this specification.

The analog-to-digital converter 47 acts as a monitoring circuit by receiving analog signals and converting them into a digital signal. Outputs from the +5V/+12V/−12V current monitors 73–75 (described below) and thermal resistors (not shown) are converted from analog signals into a digital signal and is used for telemetry data.

In the preferred embodiment, once a particular GPS satellite's signal has been acquired by the correlators 50,51, the microcontroller 65 closes the necessary tracking loops required to maintain the lock on the acquired GPS satellite signal. Either the processor board 2 or the microcontroller 65 can close the tracking loops in order to maintain a satellite signal lock, but preferably the microcontroller 65 services the correlators to offload utilization time for correlation from the microprocessor 34.

In the present invention, tracking is achieved by using the microcontroller 65 to close the tracking loops, rather than the microprocessor 34 on the processor board 2. The off-loading of tracking processing onto the microcontroller 65 allows the processor to perform additional tasks. This feature of the present invention becomes even more advantageous when multiple GPS boards are present in the spaceborne GPS receiver 1. Each individual GPS board is able to close the satellite tracking loops without demanding large amounts of correlation processing time from the microprocessor 34 on the processor board 2.

Figure 8:
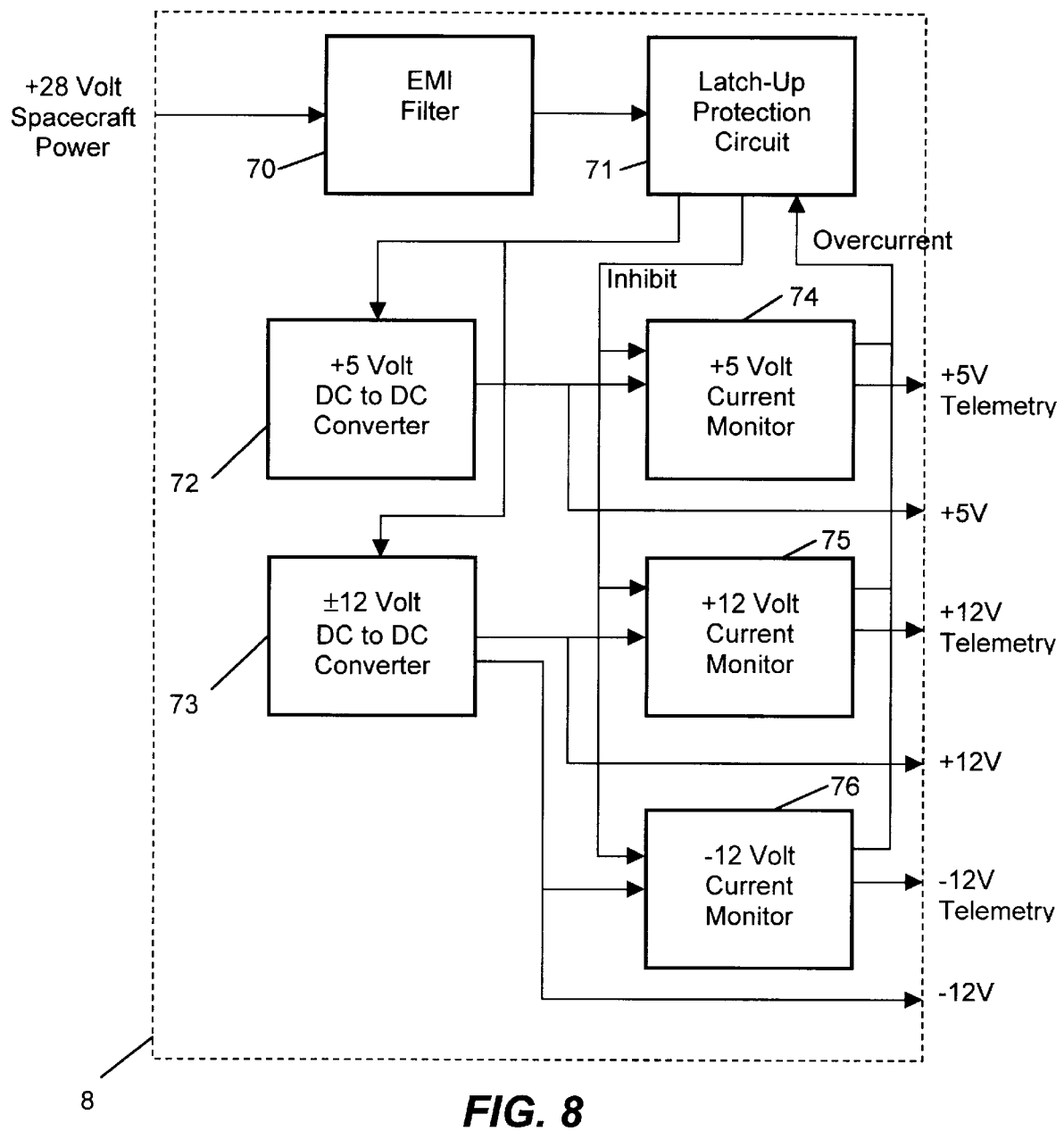
FIG. 8 illustrates a block diagram of the motherboard as used in the spaceborne GPS receiver of FIGS. 2 and 3.

Referring to FIG. 8, the preferred embodiment of motherboard 4 of the spaceborne GPS receiver 1 is illustrated in detail. The motherboard 4 includes a CPCI connectors (not shown), a power board 8, an electromagnetic interference ("EMI") filter 70 and a latch-up protection circuit 71. The power board is hardwired to the motherboard 4. Elements such as wiring and individual connectors are not shown for clarity's sake and are known in the art. The powerboard further includes a +5V DC-to-DC converter 72, ±12V DC-to-DC converter 73, +5 volt current monitor 74, +12 volt current monitor 75, and −12 volt current monitor 76. Preferably, all the elements are mounted on the power board 8, such that it forms a singular unit.

The +28 volt power bus from the spacecraft is connected to EMI filter 70 and through a common mode choke (not shown). In the preferred embodiment, the EMI filter 70 is manufactured by Interpoint due to its low reflected input ripple characteristics. The EMI filter 70 meets MIL-STD-461 requirements, and is matched to the DC-to-DC converters 72,73.

The filtered +28 volts from the EMI filter 70 drives the latch-up protection circuit 71, which, in turn, prevents the circuitry within the spaceborne GPS receiver 1 from burnout due to catastrophic latchup. The +28 volt spacecraft powers the latch-up protection circuit 71 as well as the DC-to-DC converters 72,73. This allows the latch-up protection circuit 71 to continue to operate even if the DC-to-DC converters 72,73 are shut off due to a power-down event.

The power routing continues from the latch-up protection circuit 71 to the DC-to-DC converters 72,73. Preferably, the DC-to-DC converters 72,73 is are switching regulators and converts the +28 volt spacecraft power into +5 volts, +12 volts and −12 volts. In the preferred embodiment, the converter is manufactured by Interpoint and includes a high efficiency switching regulator. When the DC-to-DC converter 72 receives a signal from the latch-up protection circuit 71 indicating that the spaceborne GPS receiver 1 has latched, the DC-to-DC converters 72,73 cycle the power, thereby resetting the whole spaceborne GPS receiver 1.

The +5v/+12v/−12v outputs are connected to the CPCI motherboard. In addition, the +5v/+12v/−12v outputs are connected to +5 volt current monitor 74, +12 volt current monitor 75, and −12 volt current monitor 76, respectively. Likewise, the outputs of the current monitors are connected to the CPCI motherboard (not shown). The current monitors 74–76 are telemetry points and signal overcurrent conditions to the latchup protection circuit 71.

A detailed description of preferred embodiments of a satellite selection method for spaceborne GPS receiver for a spacecraft with a nadir or non-nadir orientation embodying the present invention will now be given referring to the accompanying drawings.

Figure 9:
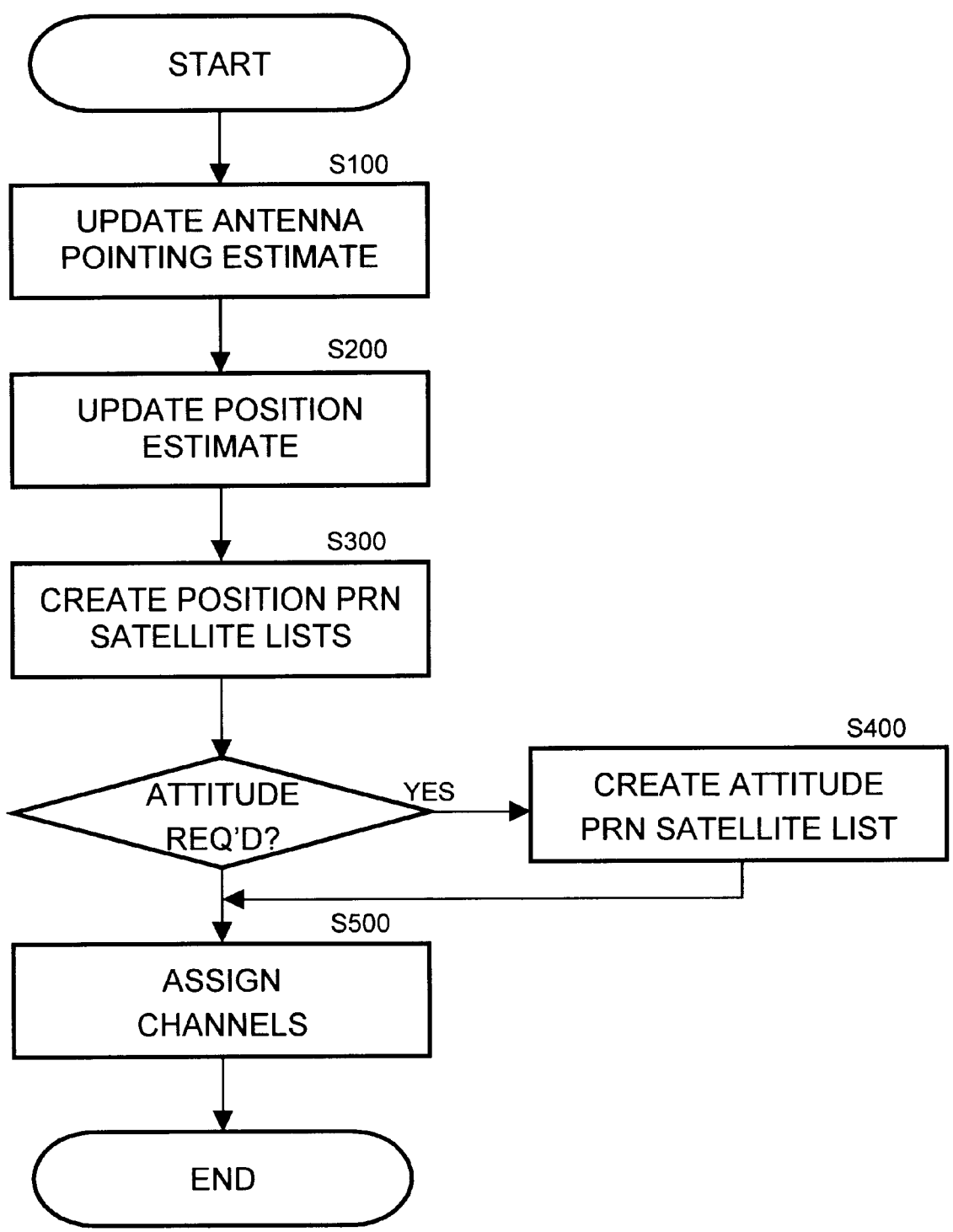
FIG. 9 illustrates the process flow of the satellite selection method.

Referring to FIG. 9, the method for selecting GPS satellites to determine a navigational solution for a spacecraft will now be described in summary fashion. As shown by Step S100, the first step is updating the antenna pointing estimate of the spacecraft. At Step S200, the position estimate of the spacecraft is updated. After the antenna pointing estimate and the position estimate are updated, at Step S300, GPS satellites are ranked on the basis of the antenna pointing estimate and position estimate to create a position PRN satellite list, and the list is used for position determinations. If an attitude determination is required, GPS satellites are again ranked under different criteria to create an attitude PRN satellite list, as shown by Step S400. Finally, at Step S500, channels are assigned to selected GPS satellites.

Figure 10:
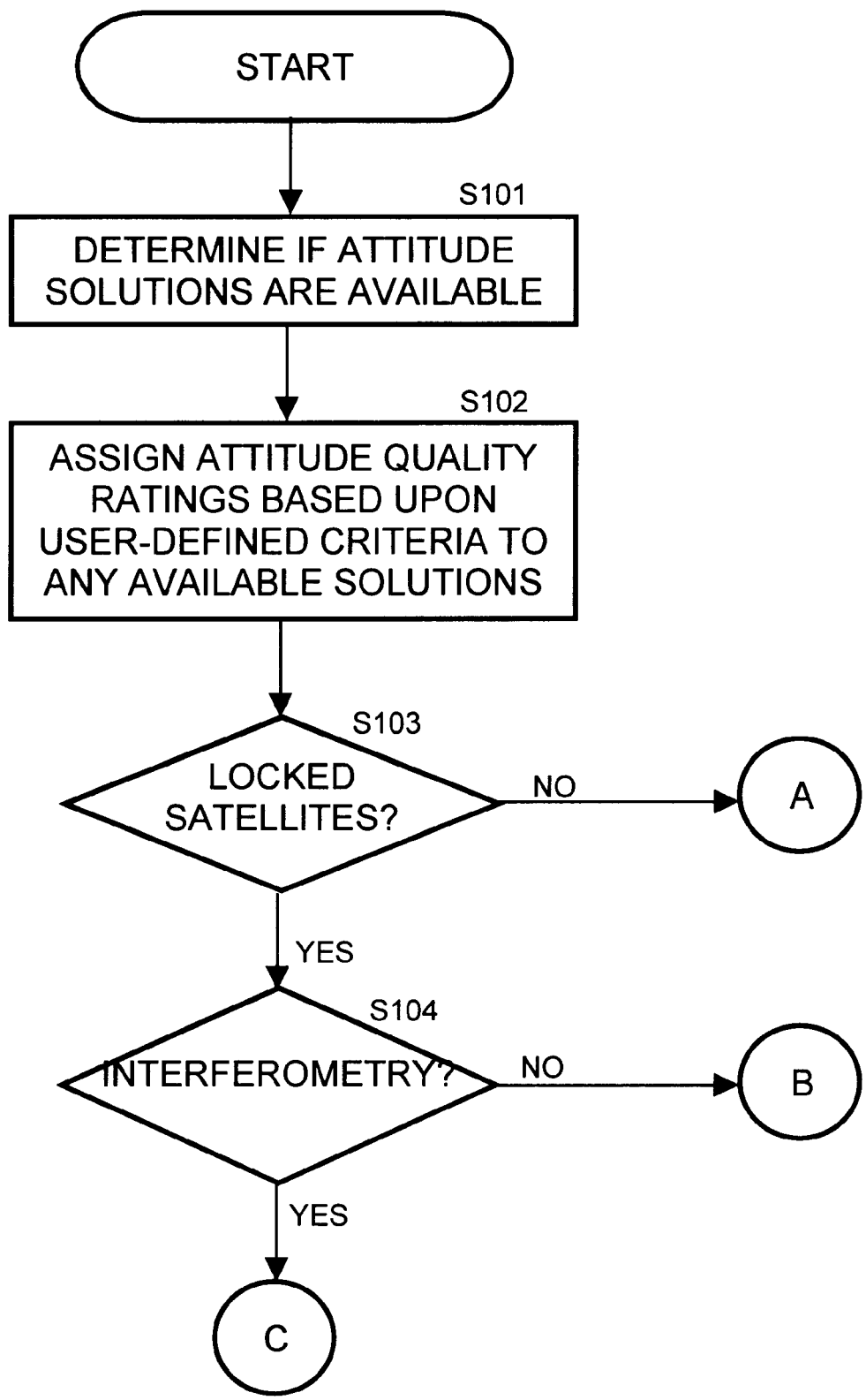
FIG. 10 illustrates the satellite selection method process flow for updating the antenna pointing estimate.

Referring to FIG. 10, the first step of the satellite selection method will now be described in more detail. The spaceborne GPS receiver 1 requires an estimation of its attitude. As shown in Step S101, the satellite selection method will determine if there are any attitude solutions available for use from the spacecraft, as a spacecraft antenna pointing estimate. If a spacecraft attitude solution is available from the host, an attitude quality rating will be calculated.

An essential element of the satellite selection method is the assumption that the position and attitude estimates are correct for some calculation. Each estimate is given a Quality Rating ("QR"). This QR will be used during various steps within the satellite selection method. A low QR indicates that the estimation is poor, whereas a high QR is indicative of a trustworthy estimation. The QR should be updated based on last position/velocity/time ("PVT") solution (if one exists), how many satellites are acquired, whether the host satellite has given the spaceborne GPS receiver 1 any attitude or position information, and any other factors that effects the QR of the estimate.

As shown in Step S102, a quality rating will be assigned to the spacecraft attitude solution. Equation (1) gives the quality rating of the spacecraft attitude solution. Y is the quality factor given to the spacecraft. A value of 100 may be used, as the attitude from the spacecraft is usually accurate. $T_{ls}$ represents of the number of minutes that have passed since the last position/velocity/time solution. This factor has a minimum value of 1.

$$QRA_{sc}=Y/T_{ls} \qquad \text{Equation (1)}$$

The result from Equation (1) is used to determine whether the spacecraft attitude solution will be used for the ranking of the GPS satellites.

Referring to FIG. 10, at Steps S103 and S104, the satellite selection method will determine whether there are any locked satellites and whether those satellites are cross-locked. This determination will guide the satellite selection method in its selection of which method to use for calculating an antenna pointing estimate.

Figure 11:
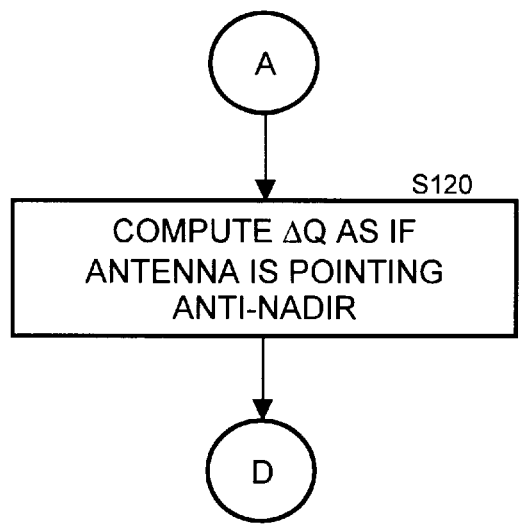
FIG. 11 further illustrates the satellite selection method process flow for updating the antenna pointing estimate.

Referring to FIG. 11, if no GPS satellites are being tracked, then, at Step S120, the satellite selection method will assume that the position estimate is good and the spaceborne GPS receiver 1 is pointing anti-nadir. The satellite selection method will compute a delta quaternion using the anti-nadir orientation, thereby creating a calculated antenna pointing estimate.

Figure 12:
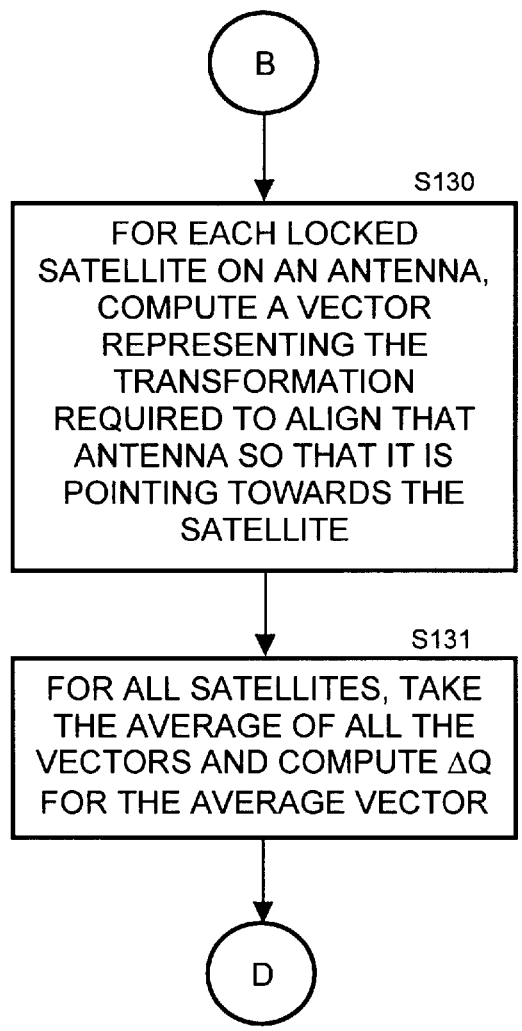
FIG. 12 further illustrates the satellite selection method process flow for updating the antenna pointing estimate.

Referring to FIG. 12, if there are GPS satellites that are acquired and currently being tracked, then, at Steps S130 and S131, the Antenna Pointing Filter ("APF") is used. The APF calculates the average acquired satellite vector. For each GPS satellite that has been acquired by the spaceborne GPS receiver 1, the spacecraft attitude quaternion is recalculated so that the antennas are pointing toward that GPS satellite. The GPS satellite vector is then transformed into body frame coordinates using the current ("old") quaternion. Finally, a delta quaternion between the two vectors is calculated.

The calculation of the average antenna pointing vector will now be described in greater detail. Let $\vec{u}$ be the antenna vector transformed into earth-centered inertial ("ECI") coordinates (X-axis towards the spring equinox) or earth-centered earth-frame ("ECEF") coordinates (X-axis points towards zero degrees latitude, Z-axis points out of the north pole) such that Equation (2) applies.

$$\vec{U} = q_{old}^* \vec{V}_{ant} q_{old} \qquad \text{Equation (2)}$$

$\vec{v}_i$ represents the vector to the ith acquired GPS satellite. Applying the following equations:

$$\vec{V}_{avg} = \frac{\Sigma \vec{v}_i}{|\Sigma \vec{v}_i|} \qquad \text{Equation (3)}$$

$$\Delta q = \frac{1}{|\vec{V}_{avg} + k\vec{u}|} \begin{bmatrix} \vec{V}_{avg} \times \vec{u} \\ \vec{V}_{avg} \cdot \vec{u} + k \end{bmatrix} \qquad \text{Equation (4)}$$

where k is a filter constant. If k=1, then the attitude quaternion is changed to match $\vec{V}_{avg}$ in ECI (or ECEF) to $\vec{V}_{ant}$ in the body frame. If k>1, then Equation (4) acts as a infinite impulse response filter. The attitude quaternion should be updated as follows:

$$q_{new} = (\Delta q)(q_{old}) \qquad \text{Equation (5)}$$

Figure 18:
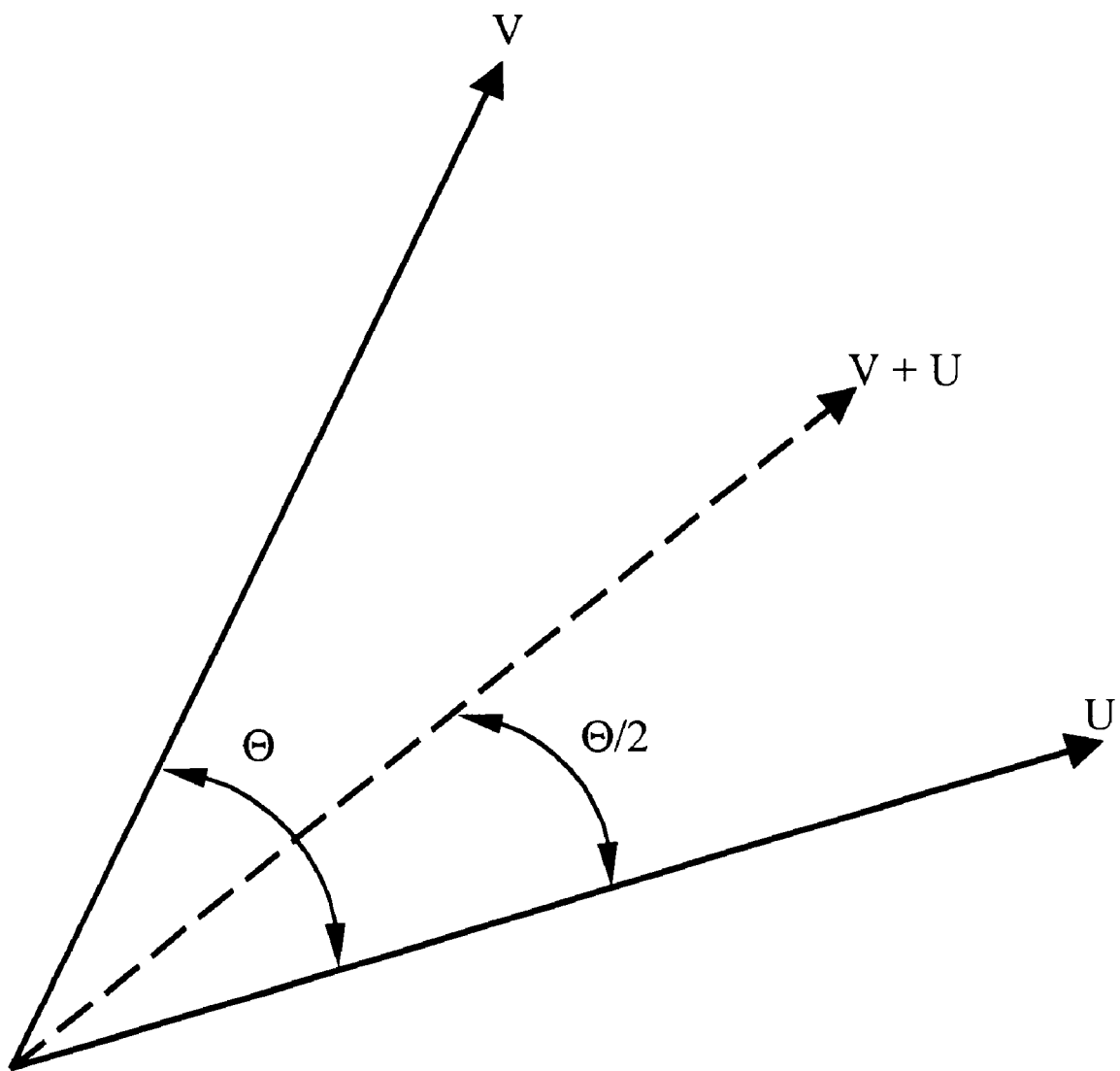
FIG. 18 illustrates the average pointing vector as used to calculate the antenna pointing estimate.

Referring to FIG. 18, the delta quaternion will now be described. Assume that $\vec{v}_i$ and $\vec{u}$ are unit vectors in the same reference frame. A quaternion may be formed as follows:

$$\Delta q = \begin{bmatrix} \left(\frac{\vec{v}+\vec{u}}{|\vec{v}+\vec{u}|}\right) \times \vec{u} \\ \left(\frac{\vec{v}+\vec{u}}{|\vec{v}+\vec{u}|}\right) \cdot \vec{u} \end{bmatrix} = \begin{bmatrix} e_1 \sin\Theta/2 \\ e_2 \sin\Theta/2 \\ e_3 \sin\Theta/2 \\ \cos\Theta/2 \end{bmatrix} \qquad \text{Equation (6)}$$

The cross product of Equation (6) will assure that the eigenaxis is orthogonal to $\vec{v}_i$ and $\vec{u}$.

Figure 13:
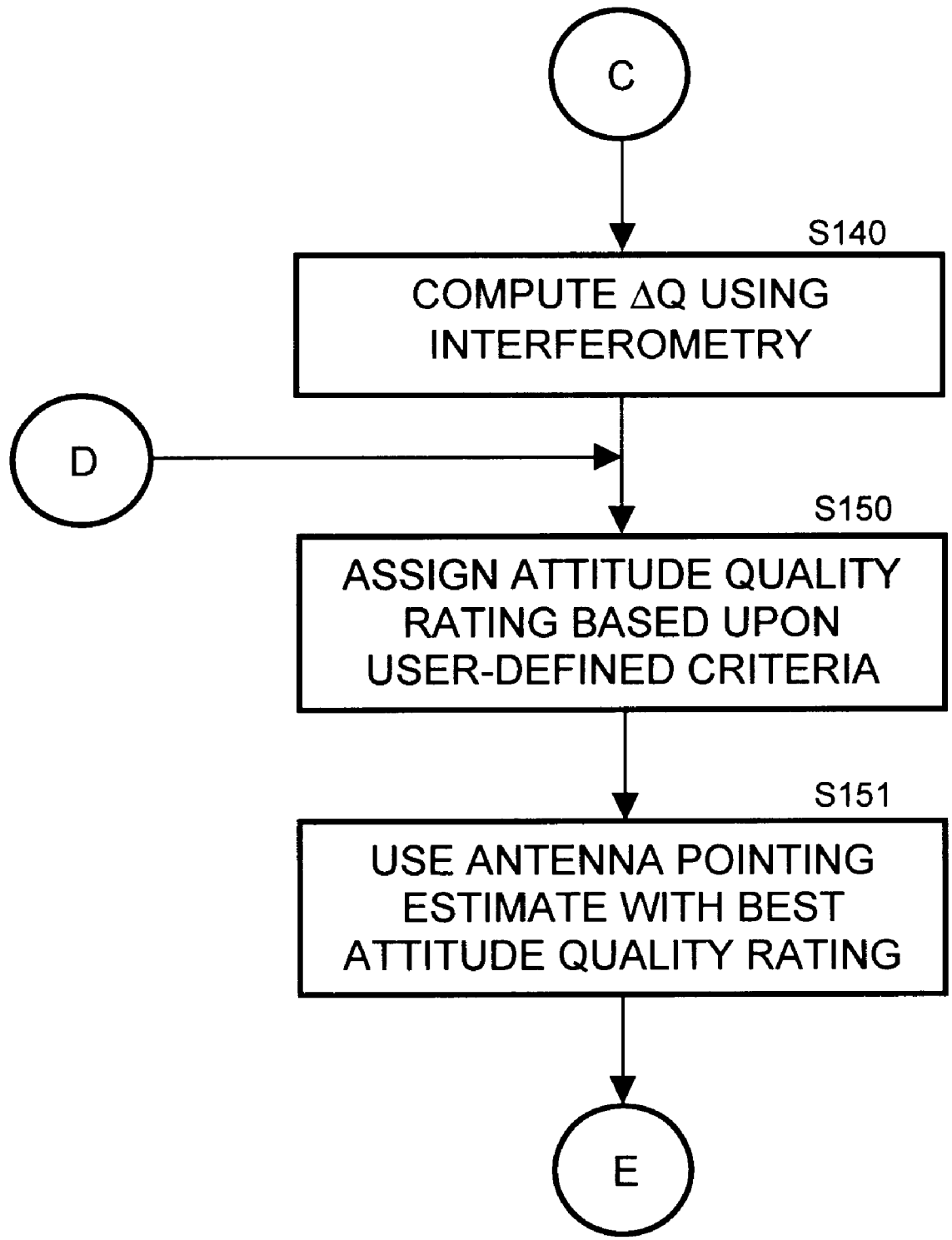
FIG. 13 further illustrates the satellite selection method process flow for updating the antenna pointing estimate.

Referring to FIG. 13, if there are GPS satellites that are currently acquired, tracked and cross-locked, then, at Step S140, the delta quaternion is computed using interferometry. The techniques of interferometry are known to those skilled in the art, and are well detailed in numerous references. The use of GPS satellites for spacecraft attitude determination is disclosed several references: (1) U.S. Pat. No. 5,548,293 "System and Method for Generating Attitude Determinations using GPS," issued Aug. 20, 1996 to Clark E. Cohen; (2) U.S. Pat. No. 5,296,861, "Method and Apparatus for Maximum Likelihood Estimation Direct Integer Search in Differential Carrier Phase Attitude Determination Systems," issued Mar. 22, 1994 to Donald T. Knight; and (3) U.S. patent application Ser. No. 08/929,912 "Method for Attitude Determination Using GPS Carrier Phase Measurements from Nonaligned Antennas," filed Sep. 15, 1997 by Edgar Glenn Lightsey.

The spherical trigonometry of phase angle measurements is disclosed in *Spacecraft Attitude Determination and Control*, J. R. Wertz, ed., D. Reidel Co., 1978. Vehicle attitude determination using GPS signals is made, taking into account the differential phase received by, for example, three antennas from the same GPS signals.

Conventional methods of vehicle attitude determination include using the differential phase of the GPS signals received by several different antennas, which are all aligned with each other and pointed in the same direction, relative to the GPS signal being received. In determining the attitude of a vehicle using the differential phase method, an absolute phase of the GPS signal received by one antenna is subtracted from the GPS signal received by a second antenna, as shown below:

$$\Delta\phi = \phi_2 - \phi_1 \qquad \text{Equation (7)}$$

Equation (7) provides information about how far apart a first antenna is from a second antenna along the GPS signal line of sight. By calculating the differential phase ($\Delta\phi$), common error sources interjected by the GPS signal and by the reception of the GPS signal by the antennas are removed. For example, the GPS signal is a right handed circular polarized ("RHCP") signal, and the phase contribution due to this polarization effect is removed by calculating the differential phase of the GPS signal.

Signals broadcast from GPS satellites have previously been used to determine vehicle position. Attitude determination of a platform or vehicle using carrier signals has not traditionally been considered a standard GPS measurement, but attitude determination of a vehicle using GPS carrier signals greatly enhances the overall utility of a device sensing GPS signals, and has been performed in recent years.

At Step S140, an attitude quality factor rating for the calculated antenna pointing estimate is computed. The acronym "GDOP" represents the geometric dilution of precision of a particular configuration of satellites used in a given solution.

$$QRA_{interf} = \qquad \text{Equation (8)}$$
$$30/X/T_{ls} \begin{cases} X = GDOP \text{ of last attitude solution} \\ X = 1 \cdot 0 \quad e^{10} \text{ if no solution} \end{cases}$$

At Step S141, the satellite selection method selects between the spacecraft antenna pointing estimate and the calculated antenna pointing estimate. The antenna pointing estimate with the most favorable attitude quality factor rating is selected. $QR_{sats}$ represents the number of GPS satellites that are currently acquired.

$$QRA = \max(0, QR_{sats}, QRA_{interf}, QRA_{sc}) \qquad \text{Equation (9)}$$

The output of Equation (9) is the antenna pointing estimate that will be used to rank the GPS satellites for the position PRN satellite list.

Figure 14:
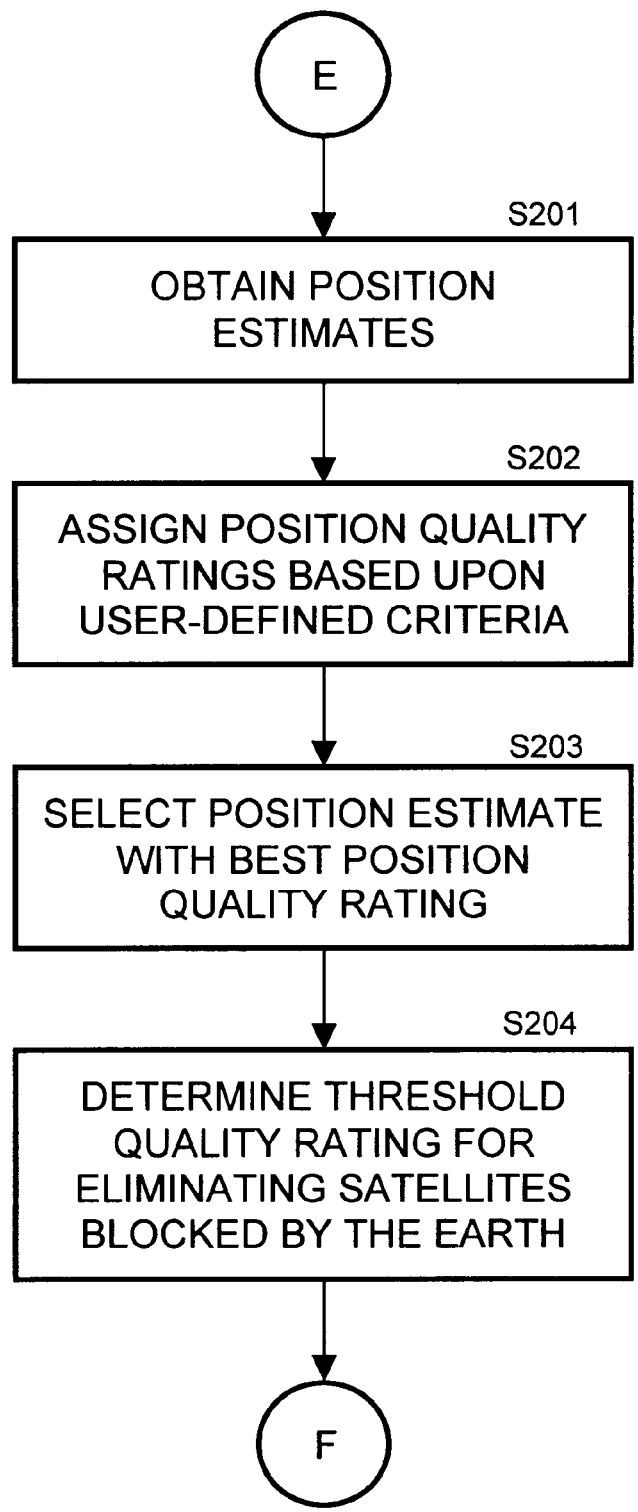
FIG. 14 illustrates the satellite selection method process flow for updating the position estimate.

Referring to FIG. 14, the next step in the satellite selection method is to update the position estimate. As shown by Step S201, the satellite selection method determines if there are any spacecraft position estimates available. A point solution or an extended-Kalman filtering technique is used to estimate the receiver position, velocity and time. The extended-Kalman filtering technique uses orbital dynamic models to propagate position estimate if there is no satellite observation. In the preferred embodiment, the Global Positioning System Enhanced Orbit Determination Experiment ("GEODE") and the Navstar GPS ICD 200 are used as orbit propagators. GEODE will provide a filtered solution for position, velocity and time. GEODE provides a real-time total position accuracy of better than 20 meters, a real-time total velocity accuracy of 0.03 meters/second, and most importantly, can withstand the loss of contact with the GPS satellites for several hours without undergoing a significant degradation in accuracy. GEODE can also provide position solutions when only a single GPS satellite is available. Otherwise, the pseudo-range and Doppler frequency measurements taken from acquired GPS satellites are used to create the position estimate.

As shown by Step S202, the satellite selection method assigns a quality rating to the various position estimates. As stated above, the satellite selection method assumes that the position and attitude estimates are correct for some calculation. A low QR indicates that the position estimation is poor, whereas a high QR is indicative of a trustworthy estimation. The QR should be updated based on last position/velocity/time solution (if one exists), how many satellites are acquired, whether the host satellite has given the spaceborne GPS receiver 1 any position information, and any other factors that effects the QR of the position estimate.

The quality rating factor for the position/velocity/time solution is calculated using Equation (10).

$$QRP_{point} = 30/X/T_{ls} \begin{cases} X = GDOP \text{ of last position/time/velocity point solution} \\ X = 1 \cdot 0 \quad e^{10} \text{ if no solution} \end{cases} \quad \text{Equation (10)}$$

The quality rating factor for the last filter solution is calculated using Equation (11).

$$QRP_{filter} = 30/X/T_{ls} \begin{cases} X = GDOP \text{ of last filter solution} \\ X = 1 \cdot 0 \quad e^{10} \text{if no solution} \end{cases} \quad \text{Equation (11)}$$

If the spacecraft supplies ephemeris information, that information should be accompanied with a quality factor QRX given by the spacecraft or chosen prior to launch. The spacecraft quality factor QRX should be given with the position or a default value. The preferred embodiment uses a default value of 50.

$$QRP_{sc} = QRX/T_{ls} \quad \text{Equation (12)}$$

As shown by Step S203, the satellite selection method selects the position estimate with the most favorable quality rating. The outputs of Equation (10), Equation (11) and Equation (12) are all input into Equation (13) to arrive at a quality rating factor for the position estimate.

$$QRP = \max(0, QR_{sats}, QRP_{point}, QRP_{filter}, QRP_{sc}) \quad \text{Equation (13)}$$

As shown by Step S204, the satellite selection method determines a threshold quality factor rating to eliminate GPS satellites blocked by the Earth. This factor is used to remove GPS satellites from the position PRN satellite list. This parameter should be tuned according to mission parameters. The preferred embodiment uses a starting value of 6.

Figure 15:
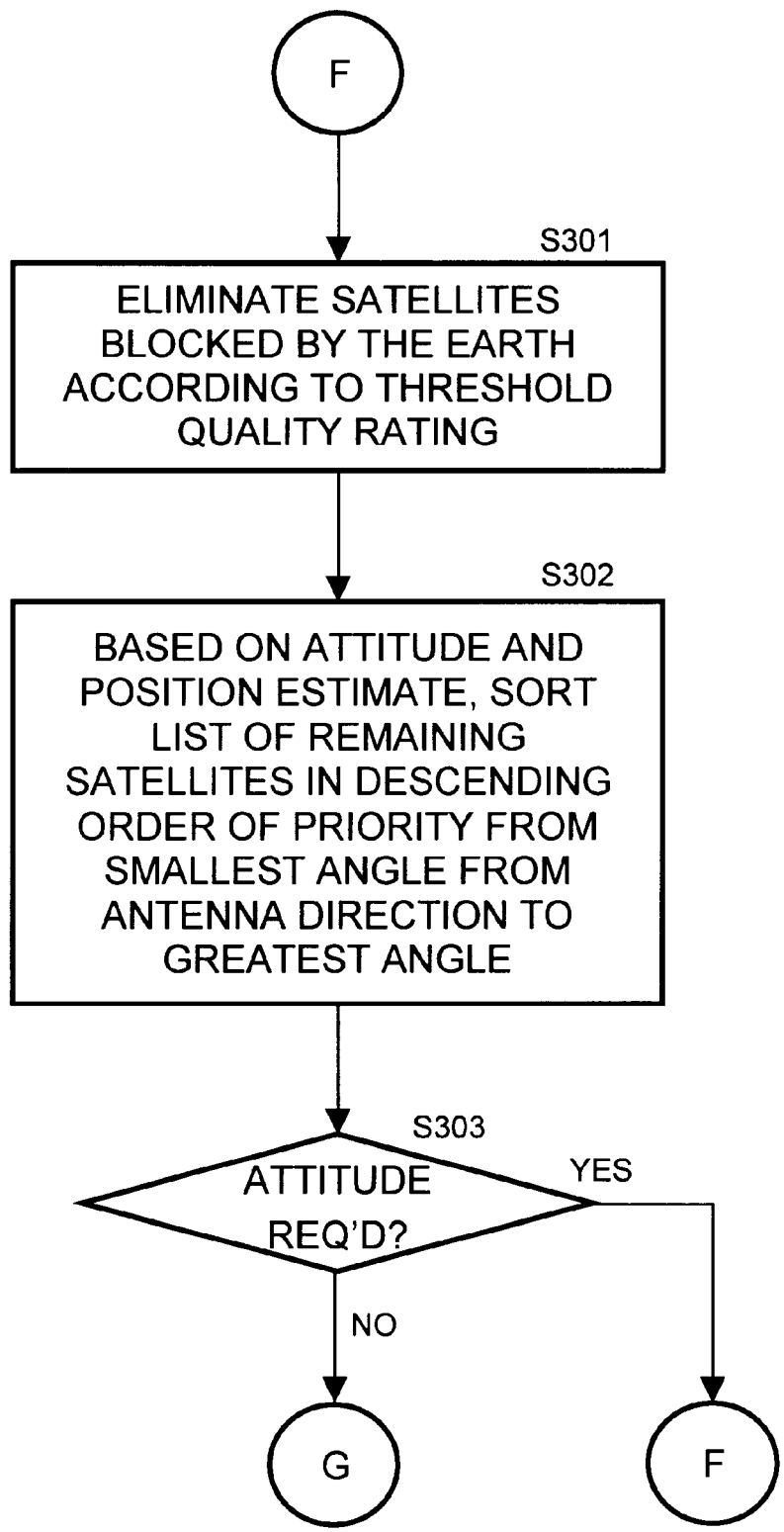
FIG. 15 illustrates the satellite selection method process flow for the selection of the position PRN satellite lists.

Referring to FIG. 15, the creation of the position PRN satellite list will now be descrbied in greater detail. The PVT pseudo-random noise ("PRN") satellite lists are made after the position estimate is complete. Each GPS satellite is ranked according to the likelihood of it being in view of the antennas. Thus, there must be one PVT PRN list per antenna. The list will always be generated based on the estimated attitude and position. Again, the estimated attitude and position will have a QR. When the correlator channels are assigned, extremely poor estimates may still be assigned channels if there are enough hardware tracking channels. The PVT PRN lists are created in the following manner:

(1) As shown in Step S301, the GPS satellites blocked from view by the Earth are eliminated, as long as the QR is greater than a user-defined threshold.

Figure 19:
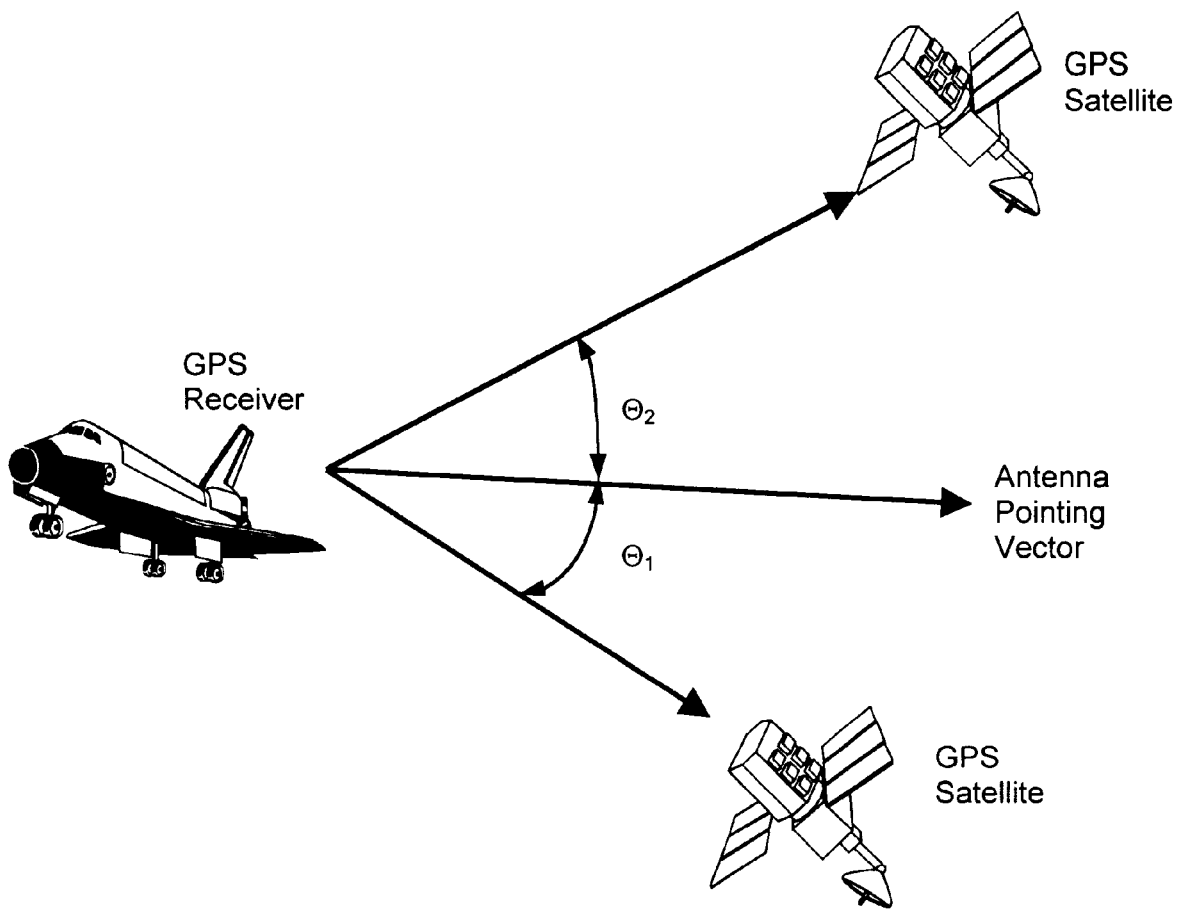
FIG. 19 illustrates the satellite selection method process flow for the selection of GPS satellites for position PRN satellite lists.

(2) As shown in Step S302, the GPS satellites are sorted in canonical order, starting with the GPS satellite that has the smallest angular deviation from the antenna pointing estimate. The satellite selection method continues to select GPS satellites with increasing angular deviations from the antenna pointing estimate. The selection process is illustrated by FIG. 19.

As shown by Step S203, the satellite selection checks to see if an attitude determination is possible. If so, the satellite selection for attitude determination is executed.

If the spaceborne GPS receiver 1 is performing attitude determination, an attitude PRN list must be created. This list will rank GPS satellites in order of desirability for an attitude determination solution. For most missions, this Attitude PRN list is only used once a good PVT solution has been achieved. Obviously, the ideal list would choose the satellites that generate the absolute best geometric dilution of precision ("GDOP") value. However, that computational problem is quite difficult to determine in the spaceborne GPS receiver 1. Instead, the microprocessor assumes all the antennas used for attitude determination are "pointing" the same general direction (e.g., mounted on the same backplane). In addition, microprocessor discards those PRNs that it determines are blocked by the Earth.

Figure 16:
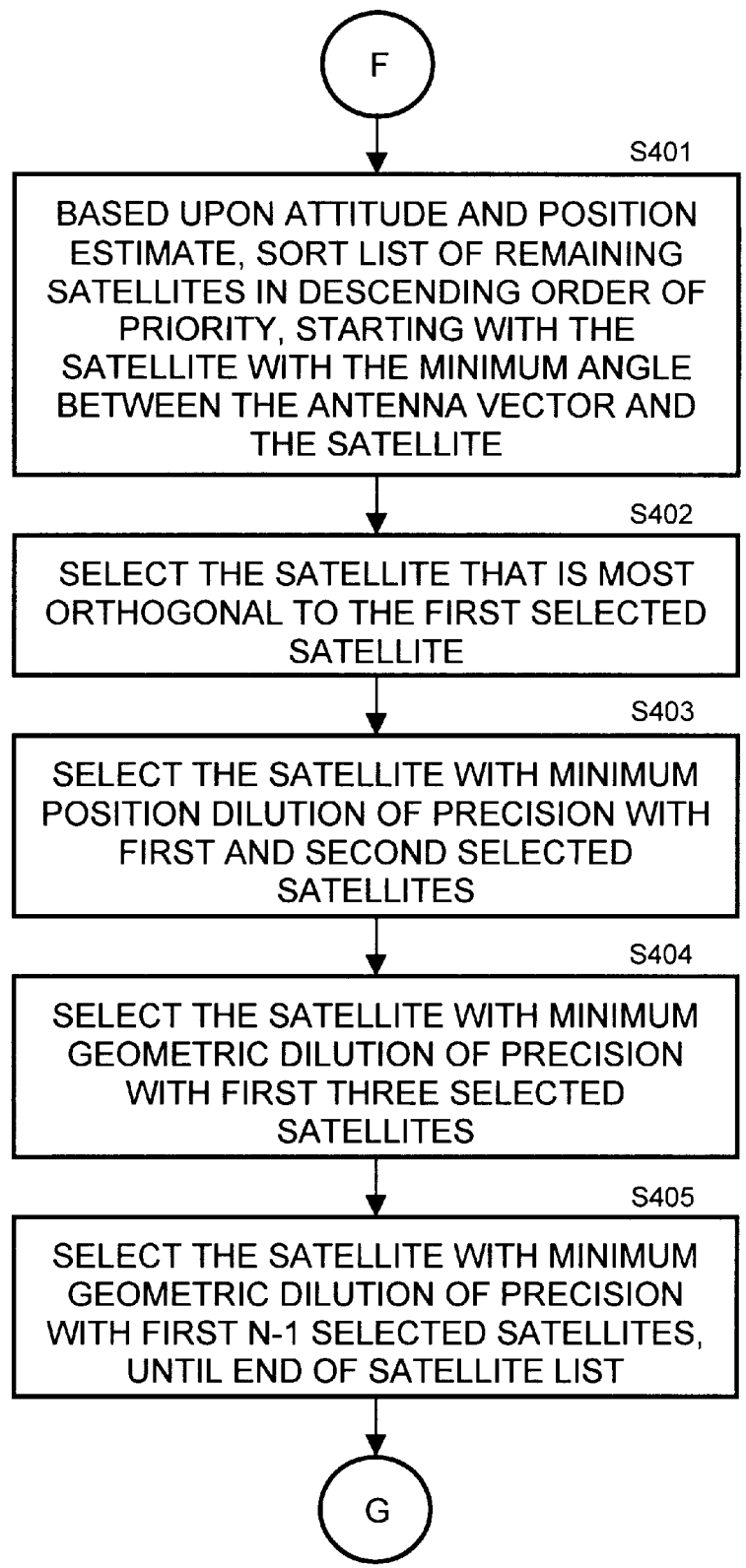
FIG. 16 illustrates the satellite selection method process flow for the selection of the attitude PRN satellite lists.
Figure 20:
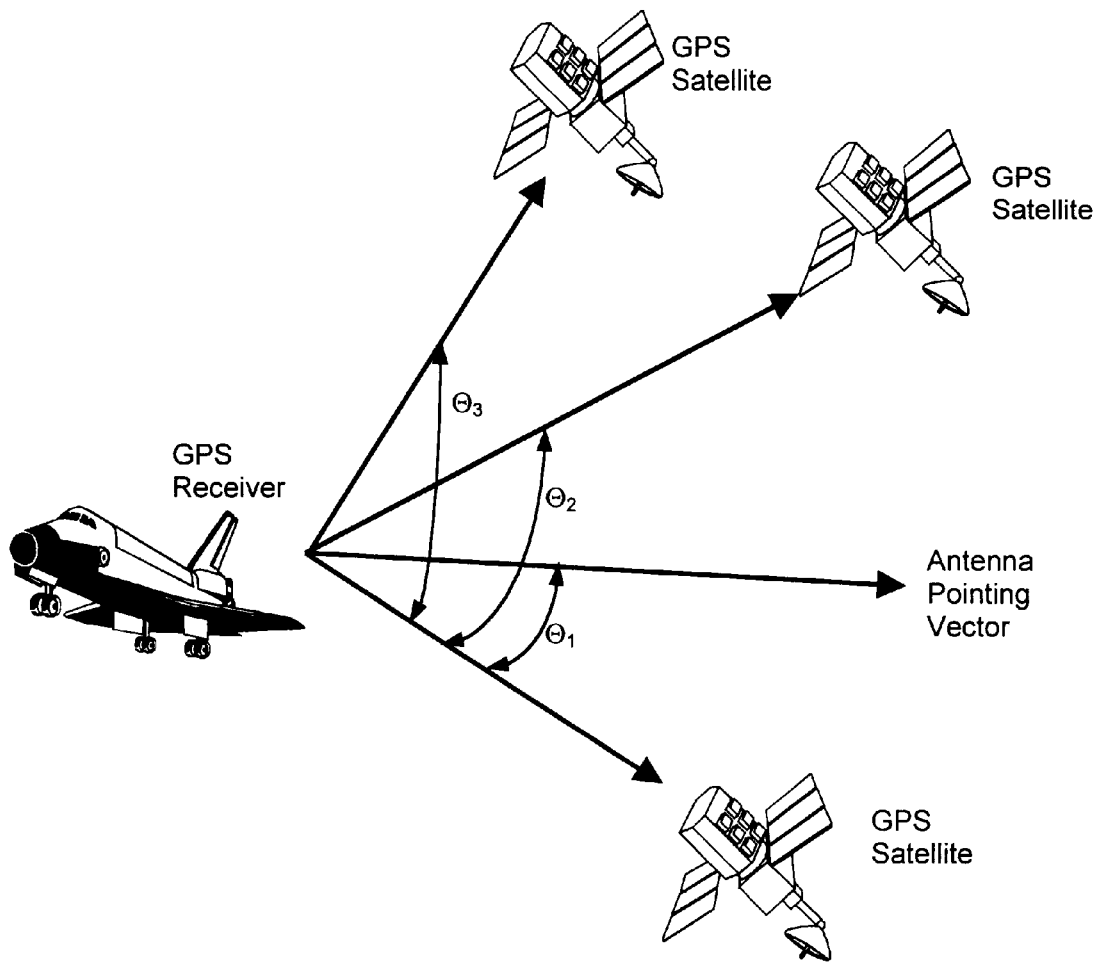
FIG. 20 illustrates the satellite selection method process flow for the selection of GPS satellites for attitude PRN satellites lists.

Referring to FIG. 16, the GPS satellites are ranked in a specific order based on information extracted by the correlators. As illustrated by Steps S401-S405, the GPS satellite that has the smallest angle between the first antenna pointing vector and the satellite will occupy the first position on the list. The second GPS satellite in the list will be the one most orthogonal to the first satellite, but still in view of the spaceborne GPS receiver 1. The third GPS satellite on the list will minimize the position dilution of precision ("PDOP") with GPS satellites one and two. The fourth GPS satellite chosen will minimize the GDOP with the first three satellites chosen. Satellites continue to be chosen on the GDOP basis until no more satellites remain to be chosen. The satellite selection process is illustrated by FIG. 20.

Correlator channels are assigned to PRNs. Channels that are to be used for attitude determination are assigned first. This is done if a GPS attitude determination is required and a satisfactory PVT solution has already been achieved. During attitude determination, each GPS satellite that will be used for the attitude solution must be acquired by the correlators through each antenna that is being used for attitude determination. This condition is referred to as "cross-locked." A cross-lock for each PRN must be achieved across all the antennas that are being used for attitude determination. Cross lock should be performed on only one PRN at a time. This is done to preserve a good PVT lock during transition. Hardware channels should be dynamically assigned to specific antennas if required. If there are any unlocked channels, those channels will be reassigned before the reassignment of locked good PVT channels. Again, this is done to prevent loss of the PVT lock during the channel reassignment transitions.

Figure 17:
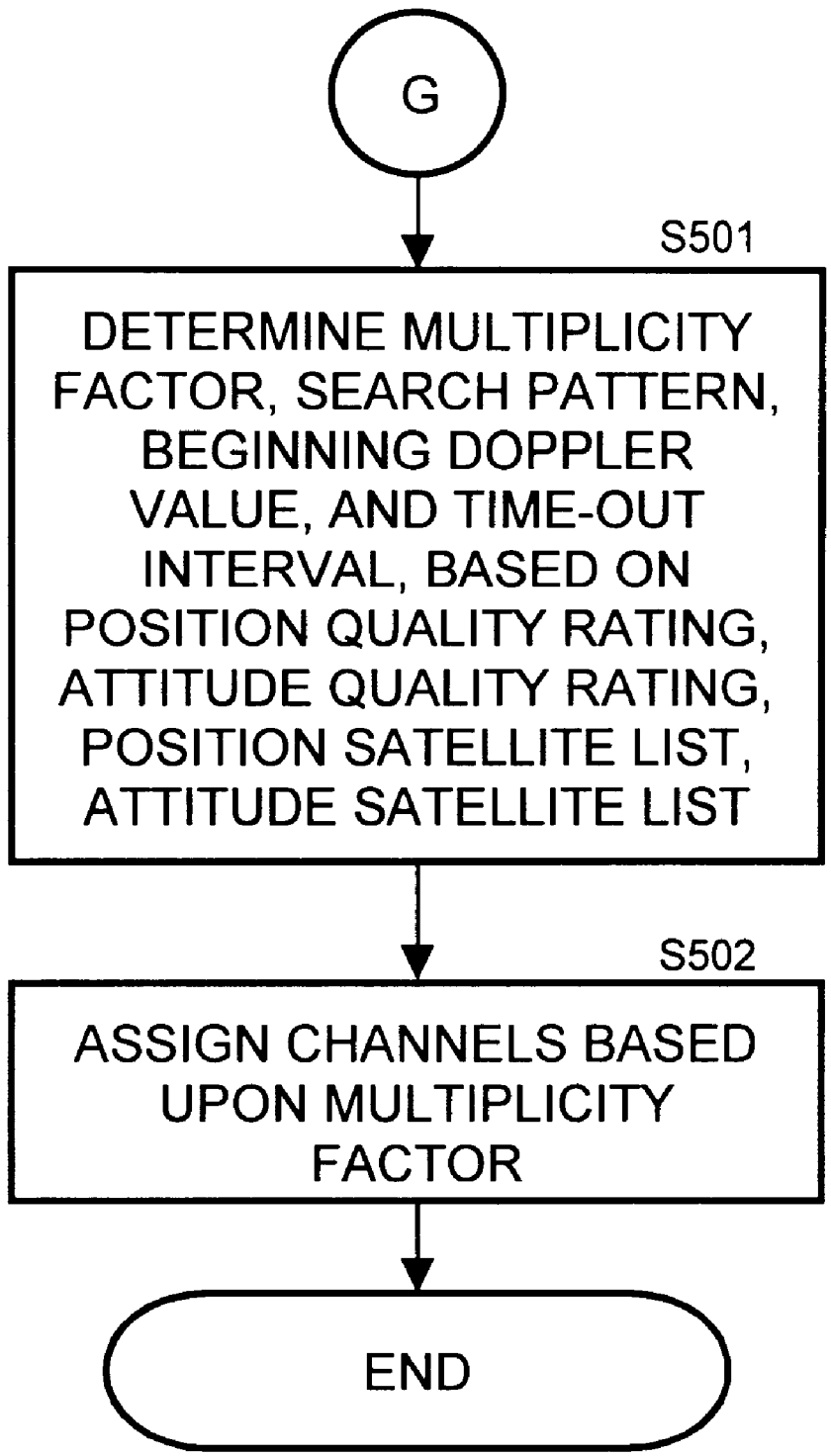
FIG. 17 illustrates the satellite selection method process flow for the assignment of channels for GPS satellites.

Referring to FIG. 17, the validity of the rest of the channels previously assigned is examined. In Step S501, a time-out factor is used that allows a GPS satellite to go idle after some user-defined time. A channel should be idled if the GPS satellite assigned to that channel will have set behind the Earth, but only if the QR for the position is good. Channels should be idled if they are locked on the same GPS satellite, and the channel is not in attitude mode. If in attitude mode, channels should be idled if they are locked on the same GPS satellite through the same antenna.

The remaining search patterns are based upon the condition in which the spaceborne GPS receiver 1 does not know the GPS time to less than one-second accuracy. In this case, the spaceborne GPS receiver 1 does not have any information about which code chip is most likely. That is, there is a uniform distribution of the likelihood of any code phase. In this case, the suggested search pattern involves sitting in a particular frequency "row" and "slowly" sliding through each code phase. "Slowly" is generally defined to be about one C/A code chip every four correlations. Once sliding through all 1023 bits of the C/A code phase, the search proceeds to the next frequency row. However, the decision of which frequency row is "next" breaks down into one-dimensional search patterns as follows:

(1) Increasing Search: the next higher frequency row is searched until maximum frequency row is reached. Once the maximum frequency is reached, the search proceeds to the lowest possible frequency row and continues to search.
(2) Decreasing Search: the search proceeds in the same manner as the Increasing Search, but decreasing in frequency row.
(3) Alternating Search: the search proceeds outward in frequency in a one-dimensional spiral. (e.g. 0, 1, –1, 2, –2, 3, –3, . . . )
(4) Stagnated Search: A search is not executed at all. The search remains on a particular frequency and repeatedly examines it, as the orbital dynamics will over the course of an orbit bring the signal's Doppler shift to the particular frequency bin that the spaceborne GPS receiver 1 is searching.
(5) User-defined Frequency Search: Allows pluggable modules for user-defined patterns.

Since the "correct" bin is changing all the time due to orbital dynamics, the likelihood of a search pattern never being in the correct bin must also be studied. For a pro-grade receiver orbit, the increasing search has a higher probability of finding the correct bin than does a decreasing search. A stagnated search is the only search type that is guaranteed not to miss the correct bin if frequency is chosen wisely. Each of these search types must be initialized with a carefully selected starting Doppler frequency. This may or may not correspond to the best estimate calculated from the assumed ephemeris.

As shown in Step S502, the channels should be assigned using the PVT PRN list based on a multiplicity factor ("MF"). The multiplicity factor is based on the QR of the position and attitude estimate. A multiplicity factor of one indicates that each satellite entry on the PVT PRN list should only be assigned to one channel.

$$MF = \begin{cases} 3 \text{ if } QRP > 10 \text{ and } QRA > 10 \\ 2 \text{ if } 10 > QRP > 5 \text{ and } 10 > QRA > 5 \\ 1 \text{ otherwise} \end{cases} \quad \text{Equation (14)}$$

A MF of two calculated by Equation (14) indicates that each satellite entry on the PVT PRN list should be assigned to two channels at different starting Doppler frequencies. The search pattern used and the starting Doppler frequencies should be a function of the attitude QR, the position QR, and the MF.

One embodiment of this invention resides in a computer system. Hence, the term "computer system" is to be understood to include at least a memory and a processor. In general, the memory will store, at one time or another, at least portions of an executable program code, and the processor will execute one or more of the instructions included in that executable program code. It will be appreciated that the term "executable program code" and the term "software" mean substantially the same thing for the purposes of this description. It is not necessary to the practice of this invention that the memory and the processor be physically located in the same place. That is to say, it is foreseen that the processor and the memory might be in different physical pieces of equipment.

The invention is embodied by a computer system adapted for the satellite selection method. The preferred embodiment of computer system is the spaceborne GPS receiver 1, but the method is not limited to that embodiment. The computer system further includes a memory including software instructions adapted to enable the computer system to perform the steps of the invention as described.

The software instructions are adapted to enable the computer system to a first portion of the executable code responsive to an external stimulus, thereby updating the antenna pointing estimate of the spacecraft. The external stimulus includes a spacecraft command to update the current satellite selection, a change in orbital position, a change in orbital orientation, or an internal timer executing a program which provides the stimulus. These are representative examples of external stimulus and are by no means limiting in nature.

The first portion of the executable software code for updating the antenna pointing estimate determines if a spacecraft attitude solution are available for use in a spacecraft antenna pointing estimate. An attitude quality rating for the spacecraft attitude solution is computed. The first portion of executable software code determines whether any GPS satellites are acquired and being tracked. If no GPS satellites are being tracked, then the first portion of executable software code causes the computer system to compute a delta quaternion in an anti-nadir orientation to create a calculated antenna pointing estimate. An attitude quality factor rating is computed for the calculated antenna pointing estimate, and then the computer system selects either the spacecraft antenna pointing estimate or the calculated antenna pointing estimate, whichever has the most favorable attitude quality factor rating is selected.

If GPS satellites are acquired and being tracked, the first portion of executable software code causes the computer system to compute a pointing vector for each GPS satellite that is currently being tracked, wherein the pointing vector represents the transformation required to point the antenna towards the tracked GPS satellite. Next, the pointing vectors are averaged to create an average pointing vector and then a delta quaternion is computed therefrom, thereby creating a calculated antenna pointing estimate. An attitude quality factor rating is computed for the calculated antenna pointing estimate, and then the computer system selects either the spacecraft antenna pointing estimate or the calculated antenna pointing estimate, whichever has the most favorable attitude quality factor rating is selected.

If GPS satellites are acquired, tracked and cross-locked, the first portion of executable software code causes the computer system to compute a delta quaternion using interferometry, thereby creating a calculated antenna pointing estimate. An attitude quality factor rating is computed for the calculated antenna pointing estimate, and then the computer system selects either the spacecraft antenna pointing estimate or the calculated antenna pointing estimate, whichever has the most favorable attitude quality factor rating is selected.

The second portion of the executable software code for updating the position estimate causes the computer system to determine if a spacecraft position solutions are available. Position solutions are available from orbit propagators. An attitude quality rating for the spacecraft position solution is computed. The second portion of the executable software code determines a threshold quality factor rating for use in eliminating GPS satellites blocked by the Earth.

The third portion of executable software code causes the computer system to rank the GPS satellites eliminate GPS satellites that are blocked from view by the Earth according to the threshold quality rating calculated by the second portion of the executable software code. For a position PRN satellite list, the GPS satellites are then sorted in canonical order, starting with the GPS satellite that has the smallest angular deviation from the antenna pointing estimate, and continuing to select GPS satellites with increasing angular deviations from the antenna pointing estimate. For an attitude PRN satellite list, the third portion of the executable software code selects, as the first satellite, one of the GPS satellites that has the smallest angle between the antenna pointing estimate and the selected GPS satellite. The next GPS satellite selected is the GPS satellite that is most orthogonal to the first satellite selected and still in view. The third GPS satellite selected is the GPS satellite that has minimal position dilution of precision with the first satellite and the second satellite. The fourth GPS satellite selected is the GPS satellite that has minimal geometric dilution of precision with the first satellite, the second satellite, and the third satellite. This process is repeated, such that the Nth satellite selected has minimal geometric dilution of precision with the N-1 satellites.

The fourth portion of the executable computer code causes the computer system to acquire each of the GPS satellites that will be used for attitude determination through each antenna that will be used for attitude determination. The fourth portion of the executable computer code enables the computer system to set GPS receiver channels to idle that were assigned to the GPS satellites that have set behind the Earth. The fourth portion of the computer code, if not performing an attitude determination, sets GPS receiver channels to idle that are locked on the identical GPS satellite. Otherwise, if an attitude determination is being performed, the fourth portion of the executable software code idles GPS receiver channels that are locked on the identical GPS satellite and are using the same antenna.

The fourth portion of the executable software code causes the computer system to assign a GPS receiver channel to one of the GPS satellites based upon estimated attitude and position of the GPS satellite and determines the starting Doppler search frequency for the assigned GPS receiver channel. The fourth portion of the executable software code sets a predetermined search pattern for the assigned GPS receiver channel. The search patterns consist of an increasing search, a decreasing search, an alternating search and a stagnated search. The fourth portion of the executable software code calculates a multiplicity factor for determining the number of GPS receiver channels required for a particular GPS satellite. The multiplicity factor is based upon the quality factor ratings for the position estimate and the antenna pointing estimate.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

Thus, while only certain embodiments of the invention have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein. It is intended that the scope of the invention be defined by the claims appended hereto, and their equivalents.

What is claimed is:

1. A spaceborne apparatus for receiving global positioning signals and calculating positional information, wherein the spaceborne apparatus includes:

at least one antenna for capturing the global positioning signals from global positioning system satellites;

at least one GPS board for correlation and tracking of the captured global positioning signals, including:

a microcontroller; and a memory, wherein executable code is stored on said memory and said memory is accessible by said microcontroller;

a processor for controlling said at least one GPS board, wherein said processor selects which of the captured global positioning signals to track, and further calculates positional information from the global positioning signals; and a motherboard to facilitate connections between said processor, said at least one GPS board and said at least one antenna.

2. The spaceborne apparatus as set forth in claim 1, wherein said microcontroller controls the correlation of the captured global positioning signals.

3. The spaceborne apparatus as set forth in claim 1, wherein said at least one GPS board further includes a serial bus for command and data transmission.

4. The spaceborne apparatus as set forth in claim 1, wherein said at least one GPS board further includes a time-marking circuit.

5. The spaceborne apparatus as set forth in claim 1, wherein said memory further includes a shared memory that is accessible by said processor.

6. The spaceborne apparatus as set forth in claim 5, wherein said at least one GPS board further includes an interface state machine for controlling access to said shared memory.

7. The spaceborne apparatus as set forth in claim 1, further including an interface bus for transmission and reception of commands and data from the spacecraft subsystems for further analysis by said processor.

8. The spaceborne apparatus as set forth in claim 7, wherein said interface bus includes a MIL-STD-1553B serial bus.

9. The spaceborne apparatus as set forth in claim 1, wherein said at least one antenna further includes a plurality of antennas.

10. A spaceborne apparatus for receiving global positioning system satellite signals and computing positional information for spacecraft subsystems therefrom, wherein the spaceborne apparatus comprises:

at least one antenna for capturing global positioning signals from global positioning system satellites;

at least one GPS board for correlation and tracking the captured global positioning signals, including:

at least one down-converter for performing down-conversion on the captured global positioning signals from said at least one antenna;

at least one correlator for correlating the down-converted captured global positioning signals; and a first processor for controlling said at least one correlator and said at least one down-converter;

a second processor for controlling said at least one GPS board and performing analysis of the down-converted captured global positioning signals; and a motherboard to facilitate connections between said second processor, said at least one GPS board and said at least one antenna.

11. The spaceborne apparatus as set forth in claim 10, wherein said at least one down-converter converts the captured global positioning signals from 1575.42 megahertz to 4.309 megahertz.

12. The spaceborne apparatus as set forth in claim 10, wherein said at least one correlator correlates the down-converted captured global positioning signals to a predetermined carrier frequency and predetermined phase code to allow said first processor to close a satellite tracking loop.

13. The spaceborne apparatus as set forth in claim 10, wherein said first processor includes:

a microcontroller; and a memory, wherein executable code is stored on said memory and said memory is accessible by said microcontroller, wherein the executable code stored on said memory contains software instructions for closing satellite tracking loops.

14. The spaceborne apparatus as set forth in claim 13, wherein said microcontroller controls the correlation of the captured global positioning signals.

15. The spaceborne apparatus as set forth in claim 13, wherein said memory on said at least one GPS board further includes a shared memory that is accessible by said first processor and said second processor.

16. The spaceborne apparatus as set forth in claim 15, wherein each of said at least one GPS board further includes an interface state machine for controlling access to said shared memory.

17. The spaceborne apparatus as set forth in claim 13, wherein said first processor further includes a serial bus for command data transmission.

18. The spaceborne apparatus as set forth in claim 13, wherein said GPS board further includes a monitoring circuit for outputting telemetry data.

19. The spaceborne apparatus as set forth in claim 13, wherein said first processor supplies the predetermined carrier frequency and the predetermined phase code to said at least one correlator, and determines which of the global positioning system satellites has been acquired.

20. The spaceborne apparatus as set forth in claim 10, wherein said second processor includes:

a microprocessor; and a memory, wherein executable code is stored on said memory and said memory is capable of being accessed by said microprocessor.

21. The spaceborne apparatus as set forth in claim 20, wherein said microprocessor that uses a RISC-type or x86-type instruction set.

22. The spaceborne apparatus as set forth in claim 20, wherein said second processor further includes a serial bus for command and data transmission.

23. The spaceborne apparatus as set forth in claim 20, wherein said microprocessor is radiation-tolerant.

24. The spaceborne apparatus as set forth in claim 20, wherein said second processor controls said first processor, said second processor performing selection of the global positioning system satellites based on satellite acquisition by said first processor and a global positioning system constellation almanac.

25. The spaceborne apparatus as set forth in claim 10, wherein said motherboard further includes a power board;

said power board including:

a power supply for said second processor and said at least one GPS board;

a current monitoring circuit for protecting said second processor and said at least one GPS board;

a latch-up protection circuit for protecting said second processor and said at least one GPS board; and an electromagnetic interference filter for suppression of electrical interference.

26. The spaceborne apparatus as set forth in claim 10, wherein said at least one antenna further includes a plurality of antennas.

27. The spaceborne apparatus as set forth in claim 10, wherein said at least one GPS board further includes a plurality of GPS boards.

* * * * *